(12) United States Patent
Johnson

(10) Patent No.: US 12,484,597 B2
(45) Date of Patent: Dec. 2, 2025

(54) SYSTEM AND METHOD FOR DISPENSING A SUBSTANCE INTO ONE OF MULTIPLE PATTERNS

(71) Applicant: BCC Product Development, L.L.C., Ormond Beach, FL (US)

(72) Inventor: Julianne Johnson, Ormond Beach, FL (US)

(73) Assignee: BCC PRODUCT DEVELOPMENT, L.L.C., Ormond Beach, FL (US)

( * ) Notice: Subject to any disclaimer, the term of this patent is extended or adjusted under 35 U.S.C. 154(b) by 289 days.

(21) Appl. No.: 18/133,327

(22) Filed: Apr. 11, 2023

(65) Prior Publication Data

US 2023/0320373 A1  Oct. 12, 2023

Related U.S. Application Data

(60) Provisional application No. 63/329,911, filed on Apr. 12, 2022.

(51) Int. Cl.
*A23G 3/02* (2006.01)
*A21C 15/00* (2006.01)
*A47K 5/14* (2006.01)

(52) U.S. Cl.
CPC .......... *A23G 3/0252* (2013.01); *A21C 15/002* (2013.01); *A47K 5/14* (2013.01)

(58) Field of Classification Search
CPC .. A23G 3/0252; A21C 15/002; A21C 15/005; A47K 5/14
See application file for complete search history.

(56) References Cited

U.S. PATENT DOCUMENTS

| | | |
|---|---|---|
| 5,361,946 A | 11/1994 | Ginther |
| 10,076,216 B2 | 9/2018 | Yang et al. |
| 10,660,481 B2 | 5/2020 | Maercovich |
| 11,020,755 B2 | 6/2021 | Hirata et al. |

(Continued)

FOREIGN PATENT DOCUMENTS

| | | | |
|---|---|---|---|
| JP | 2016043227 A | | 4/2016 |
| JP | 6983191 B2 | * | 12/2021 |
| KR | 20100075754 A | * | 7/2010 |

OTHER PUBLICATIONS

PCT International Search Report and Written Opinion in PCT/US2023/018227 dated Aug. 22, 2023; 10 pages.

*Primary Examiner* — Bob Zadeh
(74) *Attorney, Agent, or Firm* — Wolter Van Dyke Davis, PLLC; Robert L. Wolter; Cian O'Brien

(57) ABSTRACT

A system and method is provided for dispensing a substance into one of multiple patterns. The system includes a container to hold a substance and a pump in flow communication with the substance. The pump directs the substance from the container to a housing. The housing includes a first removable component with first openings that define a first pattern. The first removable component is in flow communication with the pump. The first removable component is replaceable with a second removable component defining second openings that define a second pattern different from the first pattern. The pump directs the substance through the first openings such that the substance forms a first pattern on a surface positioned proximate to the housing that is based on the first pattern of the first removable component.

19 Claims, 24 Drawing Sheets

(56) References Cited

U.S. PATENT DOCUMENTS

| | | | |
|---|---|---|---|
| 11,305,306 B2 | 4/2022 | Ophardt et al. | |
| 2007/0051748 A1* | 3/2007 | Yates | A47K 5/14 |
| | | | 222/190 |
| 2008/0314931 A1* | 12/2008 | van der Heijden | A47K 5/14 |
| | | | 222/211 |
| 2011/0139822 A1* | 6/2011 | Siu | A47K 5/122 |
| | | | 222/214 |
| 2016/0199868 A1* | 7/2016 | Ikushima | B05B 1/28 |
| | | | 239/74 |
| 2018/0297040 A1* | 10/2018 | Hirata | B05B 11/1001 |
| 2019/0047777 A1* | 2/2019 | Takahashi | B65D 83/303 |
| 2019/0125137 A1* | 5/2019 | Takagi | A45D 44/00 |
| 2021/0076884 A1* | 3/2021 | Ohnishi | B05B 11/0089 |
| 2023/0320373 A1* | 10/2023 | Johnson | A23G 3/0252 |
| | | | 222/1 |

* cited by examiner

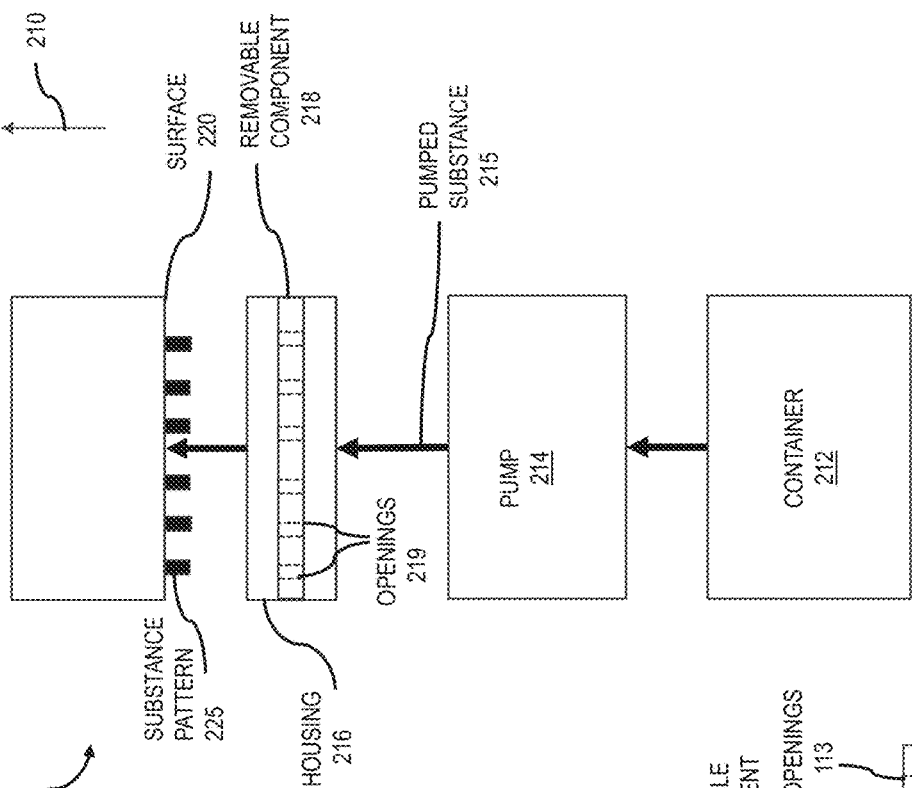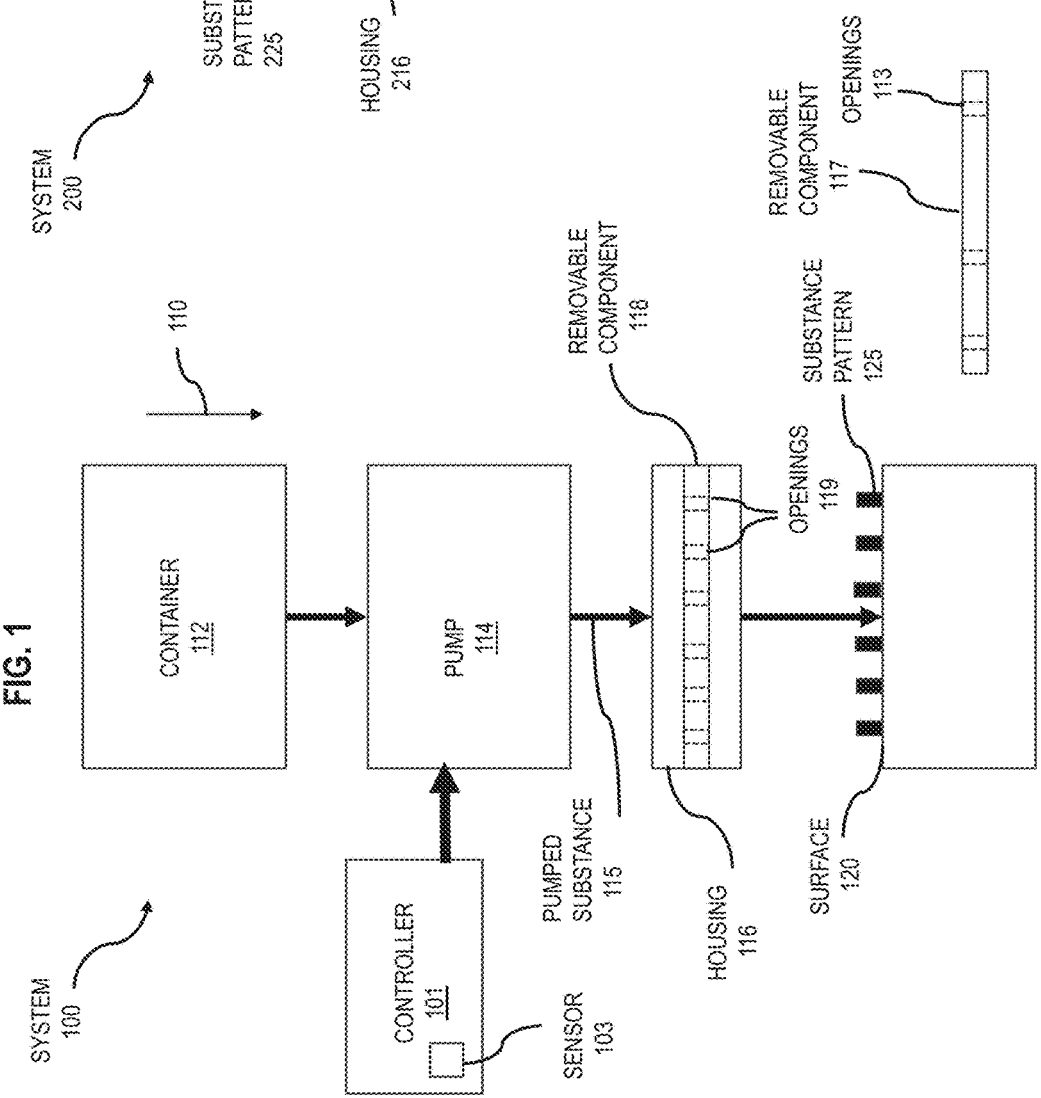

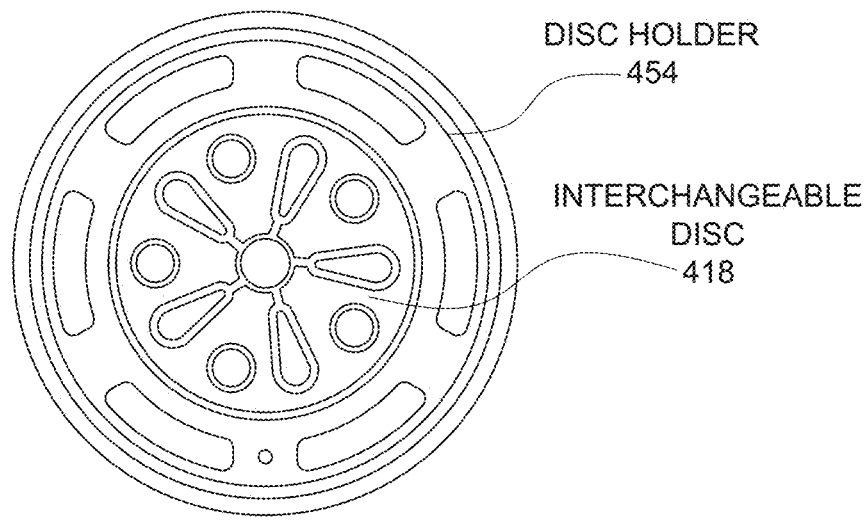
FIG. 4C
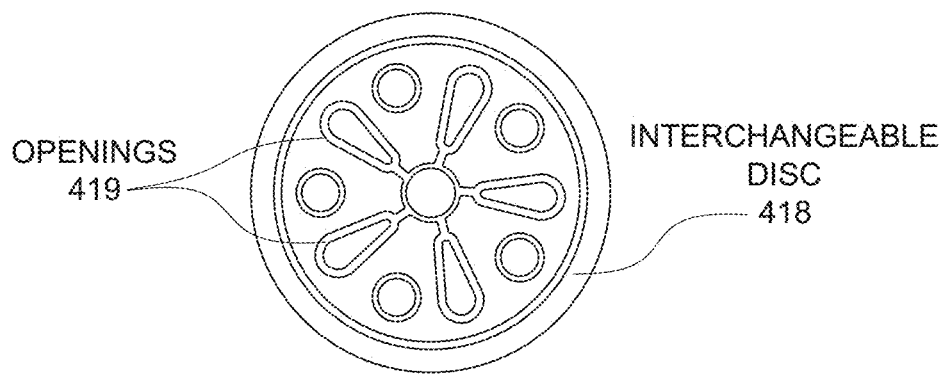
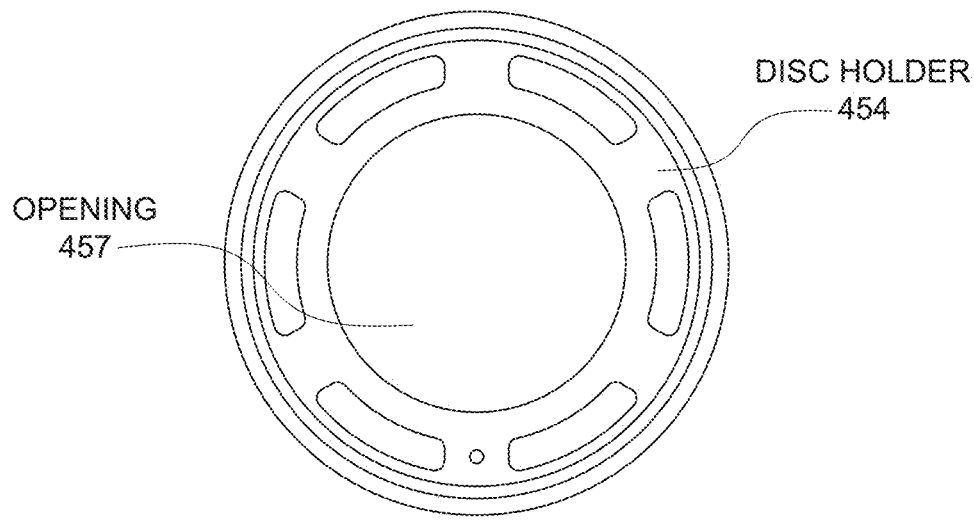
FIG. 4D

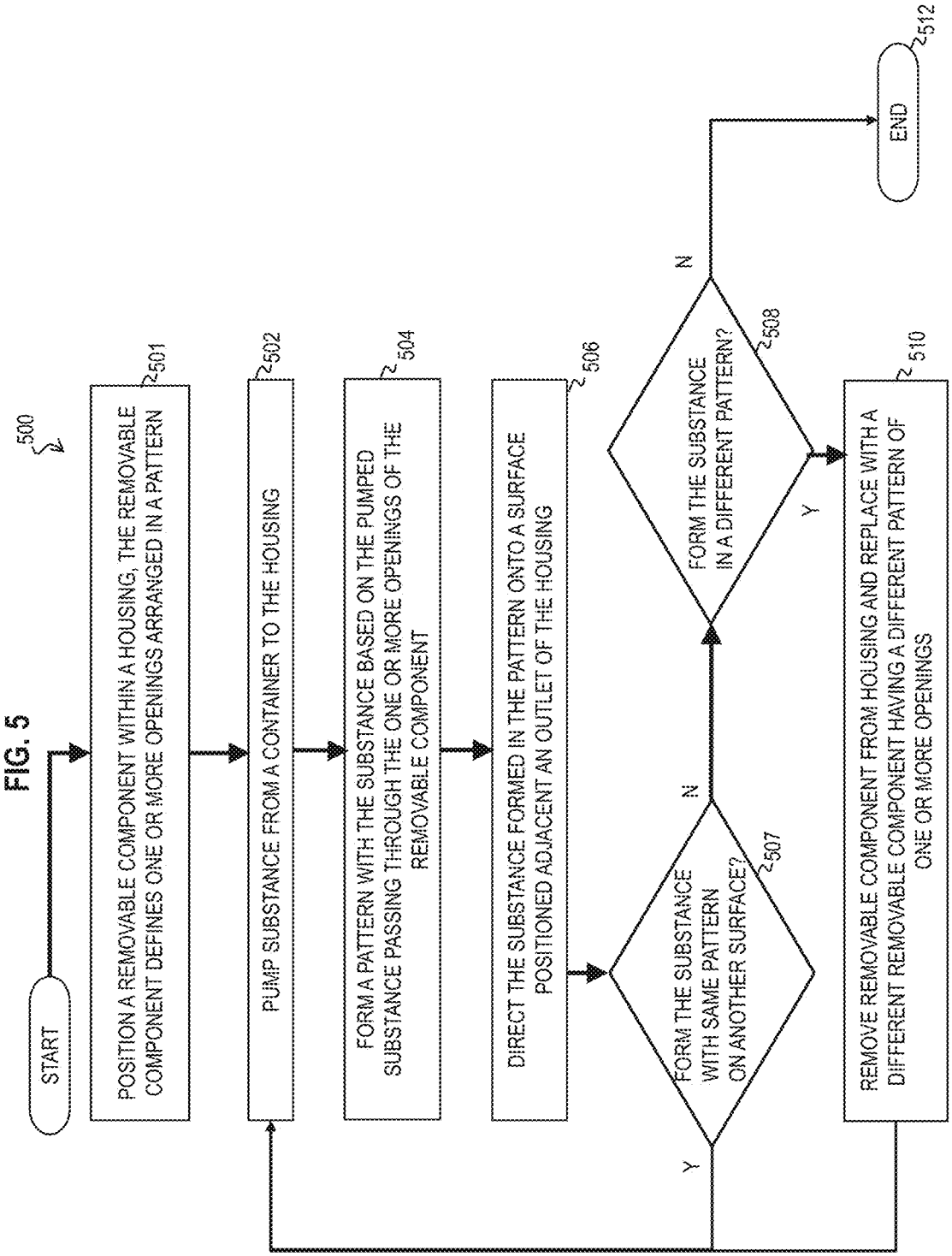

SYSTEM AND METHOD FOR DISPENSING A SUBSTANCE INTO ONE OF MULTIPLE PATTERNS

CROSS-REFERENCE TO RELATED APPLICATIONS

This application claims benefit of Provisional Appln. 63/329,911, filed Apr. 12, 2022, the entire contents of which are hereby incorporated by reference as if fully set forth herein, under 35 U.S.C. § 119(e).

BACKGROUND

Dispensing systems for various substances (e.g. soap) are well known. These systems typically involve a container that holds the substance and a pump that directs the substance out of the container and onto a surface (e.g. hand of a user).

SUMMARY

Techniques are provided for an improved system and method for dispensing a substance into one of multiple patterns. FIG. 11 is an image that illustrates an example of a conventional system 10 for dispensing soap on a hand of a user (MyKirei by KAO® Foaming Hand Soap) after which the user washes their hands (FIG. 12). The system 10 includes a container 12 to hold soap. A manual pump 14 is also provided. The user pushes down on the manual pump 14 which causes soap to form in a pattern 16 on the user's hand. The inventor of the present invention recognized several drawbacks with this conventional system. For example, the conventional system 10 is limited to dispensing a certain type of substance (e.g. soap) rather than multiple substance types. Additionally, the inventor of the present invention recognized that the conventional system 10 is limited to dispensing the substance (e.g. soap) with one specific pattern 16 on the hand of the user. Thus, if a user wanted to dispense the substance in their hand with one of multiple patterns, they would need to acquire multiple systems 10 where each system 10 dispenses the substance with one specific pattern 16. This would necessarily involve additional financial costs as well as reduced spatial efficiency since the multiple systems would take up excessive space in a kitchen, bathroom or area where the soap is typically dispensed.

To overcome these noted drawbacks the inventor of the present invention developed the system and method for dispensing a substance into one of multiple patterns as disclosed herein. The inventor recognized that in order to overcome the noted drawbacks above of conventional dispensing systems, a system should be designed which can dispense the substance (e.g., soap) in one of multiple patterns. This would overcome the noted drawback of the conventional systems which are limited to only dispensing the substance (e.g. soap) in a single pattern. The inventor also recognized that the system should be designed to be able to dispense multiple types of substance (e.g., soap, icing, etc.) which share similar characteristics (e.g. a similar range of viscosity). This improved system would not only permit a user to dispense substance in one of multiple patterns with a single system but would also permit the user to dispense multiple types of substance with the same single system.

In a first set of embodiments, a system is provided for dispensing a substance into one of multiple patterns. The system includes a container configured to hold a substance. The system also includes a pump with an inlet in flow communication with the substance in the container and an outlet. The pump is configured to direct the substance into the inlet and through the outlet. The system further includes a housing including a first removable component with one or more first openings that define a first pattern. The first removable component is in flow communication with the outlet of the pump. The first removable component is replaceable with a second removable component defining one or more second openings that define a second pattern different from the first pattern. The pump is configured to direct the substance through the outlet and through the one or more first openings in the first removable component such that the substance forms a first pattern on a surface positioned proximate to the housing that is based on the first pattern of the first removable component.

In a second set of embodiments, a method is provided for dispensing a substance into one of multiple patterns. The method includes positioning a first removable component within a housing, where the first removable component defines one or more first openings arranged in a first pattern. The method further includes directing, with a pump, substance from a container through the one or more first openings of the first removable component within the housing. The method further includes forming a first pattern with the substance based on the directing the substance through the one or more first openings of the first removable component within the housing. The method also includes removing the first removable component from within the housing and replacing the removed first removable component with a second removable component within the housing that defines one or more second openings arranged in a second pattern that is different from the first pattern. The method additionally includes directing, with the pump, substance from the container through the one or more second openings of the second removable component within the housing. The method further includes forming a second pattern with the substance based on the directing the substance through the one or more second openings of the second removable component.

Still other aspects, features, and advantages are readily apparent from the following detailed description, simply by illustrating a number of particular embodiments and implementations, including the best mode contemplated for carrying out the invention. Other embodiments are also capable of other and different features and advantages, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

Embodiments are illustrated by way of example, and not by way of limitation, in the figures of the accompanying drawings in which like reference numerals refer to similar elements and in which:

FIG. 1 is a block diagram that illustrates an example of a system for dispensing a substance in one of multiple patterns, according to an embodiment;

FIG. 2 is a block diagram that illustrates an example of a system for dispensing a substance in one of multiple patterns, according to an embodiment;

FIG. 4C is an image that illustrates an example of a top view of a removable component positioned within a holder of the removable component used in the system of FIG. 4A, according to an embodiment;

FIG. 4D is an image that illustrates an example of a top view of the removable component and the holder of FIG. 4C, according to an embodiment;

FIG. 5 is a flow chart that illustrates an example of a method for dispensing a substance in one of multiple patterns, according to an embodiment;

DETAILED DESCRIPTION

Figure 3A:
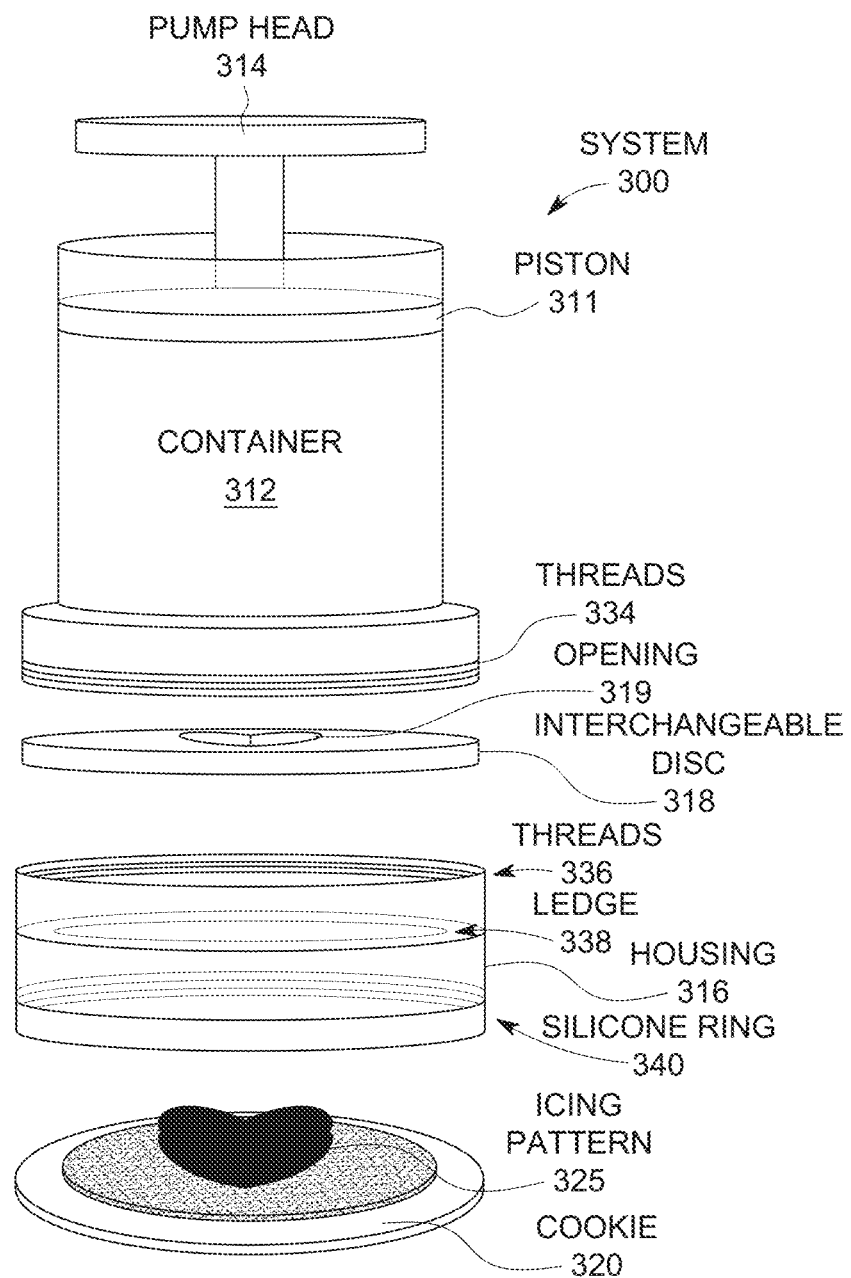
FIG. 3A is an image that illustrates an example of an exploded view of a system for dispensing a substance in one of multiple patterns on a surface of a food item, according to an embodiment.

A method and apparatus are described for dispensing a substance in one of multiple patterns. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

For purposes of this description, "substance" means a fluid having a viscosity that falls within a range at room temperature. In one embodiment, this range of viscosity is between about 20 centipoise (cps) and about 70,000 cps and/or from about 100 cps to about 5000 cps. For purposes of this description, "removable component" means a component of a system that is not an integral part of the system and can be removed and replaced with another removable component. The system features one or more structural components to accommodate the removal and replacement of one removable component with another removable component. In one example, such structural components permit the removable component to be removed and replaced from the system (e.g. a threaded connection between multiple components of the system to permit access to the removable component so that it can be removed and replaced with another removable component). In another example, the system permits the removable component to be removed and replaced without the use of tools.

Some embodiments of the invention are described below in the context of dispensing a substance (e.g. foam soap, icing, etc.) into one of multiple patterns. However, the invention is not limited to this context. In other embodiments the invention is described in the context of dispensing other substances (e.g., any type of filing, mash potatoes, humus, dough, etc.).

1. Viscosity

Most fluids offer some resistance to motion, and this resistance is called viscosity. Viscosity arises when there is relative motion between layers of the fluid. More precisely, it measures resistance to flow arising due to the internal friction between the fluid layers as they slip past one another when fluid flows. Viscosity can also be defined as a measure of a fluid thickness or its resistance to objects passing through it.

A fluid with large viscosity resists motion because its strong intermolecular forces give it a lot of internal friction, resisting the movement of layers past one another. On the contrary, a fluid with low viscosity flows easily because its molecular makeup results in very little friction when it is in motion. Gases also exhibit viscosity, but it is harder to notice in ordinary circumstances.

Viscosity is a measure of a fluid's resistance to flow. The SI unit of viscosity is poiseuille (PI). Its other units are newton-second per square meter (N s m$^{-2}$) or pascal-second (Pa s.). The viscosity of liquids decreases rapidly with an increase in temperature, and the viscosity of gases increases with an increase in temperature. Thus, upon heating, liquids flow more easily, whereas gases flow more slowly. Also, viscosity does not change as the amount of matter changes, therefore it is an intensive property.

Viscosity is measured in terms of a ratio of shearing stress to the velocity gradient in a fluid. If a sphere is dropped into a fluid, the viscosity can be determined using the following formula:

$$\eta = \frac{2ga^2(\Delta\rho)}{9v}$$

Where Δρ is the density difference between the fluid and sphere tested, a is the radius of the sphere, g is the acceleration due to gravity and v is the velocity of the sphere.

The elementary way of measuring viscosity is to allow a sphere, such as a metal ball, to drop through a fluid and time the fall of the metal ball. The slower the sphere falls, the greater the viscosity.

Figure 13:
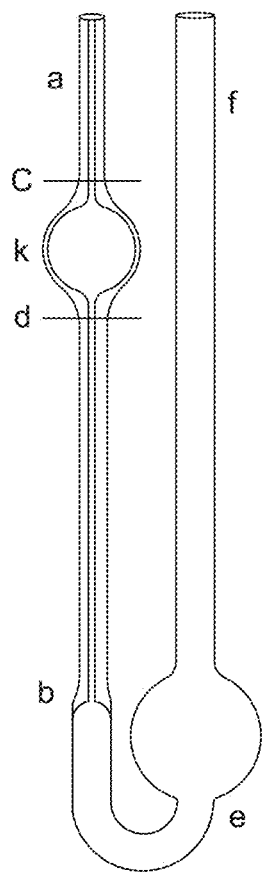
FIG. 13 is an image that illustrates an example of a conventional device for measuring viscosity of a substance.

A more accurate measure of viscosity is given by the viscometer (see FIG. 13). U-tube viscometers are also known as glass capillary viscometers or Ostwald viscometers. A viscometer consists of two reservoir bulbs and a capillary tube. In one arm of the U-tube viscometer is the capillary, a vertical section of a precise narrow bore (between b and d in FIG. 13). Above which is an upper bulb (between c and d in FIG. 8). Additionally, a lower bulb (at e in FIG. 13) lower down on the other arm as shown in the image. In use, the upper bulb draws the liquid by suction, then the liquid is made to flow down through the capillary into the lower bulb. Two marks (c and d in FIG. 13) indicate a known volume. The time taken for the liquid to pass between these marks is proportional to the kinematic viscosity. In some embodiments, a device such as the viscometer is used to measure the viscosity of the substances that are used in the system disclosed herein and in these embodiments the systems are configured to be utilized with substances that fall within a range of viscosity values that encompasses each of the substances.

Table 1 below shows some examples of ranges of viscosity values (in units of centipoise or cps). The ranges of viscosity values shown in Table 1 below are not necessarily provided to disclose a range of viscosity values of the substance used in the system and method disclosed herein (although the substance used in the system and method herein may overlap with one or more ranges listed in Table 1). Instead, these ranges of viscosity values for various known items are provided as a reference point when disclosing the ranges of the viscosity values for the substance used in the system and method of the present invention.

TABLE 1

| Item | Approximate Viscosity in Centipoise (cps) |
| --- | --- |
| Water at 70 | 1 to 5 cps |
| Blood | 10 to 20 cps |
| Antifreeze | 20 cps |
| Corn Oil or Motor Oil SAE 10 | 50 to 100 cps |
| Maple Syrup or Motor Oil SAE 30 | 150 TO 200 cps |
| Castor Oil or Motor Oil SAE 40 | 250 to 500 cps |
| Glycerin or Motor Oil SAE 60 | 1,000 to 2,000 cps |
| Honey or Corn Syrup | 2,000 to 3,000 cps |
| Blackstrap Molasses | 5,000 to 10,000 cps |
| Chocolate Syrup | 10,000 to 25,000 cps |

TABLE 1-continued

| Item | Approximate Viscosity in Centipoise (cps) |
| --- | --- |
| Ketchup or Mustard | 50,000 to 70,000 cps |
| Tomato Paste or Peanut Butter | 500,000 cps |
| Shortening or Lard | 1,000,000 to 2,000,000 cps |
| Caulking Compound | 5,000,000 to 10,000,000 cps |
| Window Putty | 100,000,000 cps |

2. Overview

The embodiments of the present invention disclose systems that are configured to dispense a substance in one of multiple patterns. FIG. 1 discloses a system 100 that is configured to dispense a substance in a first direction 110 (e.g. in a direction of gravitational acceleration) in one of multiple patterns. FIG. 2 discloses a system 200 that is similar to the system 100 of FIG. 1, but is configured to dispense a substance in a second direction 210 (e.g. opposite to a direction of gravitational acceleration) in one of multiple patterns.

FIG. 1 is a block diagram that illustrates an example of the system 100 for dispensing a substance in one of multiple patterns, according to an embodiment. The system 100 includes a container 112 configured to hold a substance 115. In one embodiment, the substance 115 has a range of viscosity values at room temperature between about 20 cps and about 70,0000 cps or between about 100 cps and 5000 cps.

The system 100 also includes a pump 114 with an inlet in flow communication with the substance 115 in the container 112 and an outlet such that the pump 114 is configured to direct the substance 115 into the inlet and through the outlet.

In some embodiments, the pump 114 is a manual pump. In this embodiment, the user manually moves a component of the pump 114 relative to the container 112, which causes the pump 114 to direct the substance 115 into the pump inlet and through the pump outlet.

In other embodiments, the pump 114 is an automatic pump. In this embodiment, the system 100 includes a sensor 103 configured to detect a manual input of a user (e.g. motion sensor to detect movement, a button to be pressed, etc.). Additionally, in this embodiment the system 100 includes a controller 101 in signal communication with the sensor 103 and the pump 114. Based on a received input from the sensor 103, the controller 101 is configured to transmit a signal to the pump 114 to automatically cause the pump 114 to direct the substance 115 into the pump inlet and through the pump outlet.

In an embodiment, the system 100 also includes a housing 116 including a first removable component 118 with one or more first openings 119 that define a first pattern. In one embodiment, the first removable component 118 is in flow communication with the outlet of the pump 114. In one embodiment, the first removable component 118 is replaceable with a second removable component 117 defining one or more second openings 113 that define a second pattern that is different from the first pattern. Although two removable components are depicted in FIG. 1, in other embodiments more than two removable components are provided (e.g. a set of removable components that are provided with multiple patterns).

In an embodiment, the pump 114 is configured to direct the substance 115 through the outlet and through the one or more first openings 119 in the first removable component 118 such that the substance 115 forms a first pattern 125 on a surface 120 positioned proximate to the housing 116 that is based on the first pattern of the first removable component 118.

In an embodiment, the system 100 is configured such that the pump 114 directs the substance 115 in a first direction 110 through the first openings 119 of the first removable component 118 and to the surface 120 where the pattern 125 of the substance is formed. In one example embodiment, the first direction 110 is oriented within an angular threshold of a direction of gravitation acceleration of the earth. In one example embodiment, the angular threshold is within about ±5 degrees. In yet another example embodiment, the angular threshold is within about ±10 degrees. In yet another example embodiment, the angular threshold is within about ±20 degrees. Accordingly, in one example embodiment, the surface 120 is positioned below the housing 116 (e.g. within a threshold distance of the housing 116) so that the pumped substance 115 through the openings 119 in the first direction 110 forms the pattern 125 on the surface 120.

FIG. 2 is a block diagram that illustrates an example of a system 200 for dispensing a substance 215 in one of multiple patterns, according to an embodiment. In an embodiment, the system 200 is similar to the system 100 and includes components that operate in a similar manner as the components of the system 100 discussed above. In this embodiment, the container 212, the pump 214, the housing 216, the removable component 218 and the surface 220 operate in a similar manner as the respective container 112, the pump 114, the housing 116, the removable component 118 and the surface 120, with the exception of the features discussed herein.

In an embodiment, unlike the system 100 of FIG. 1, which is designed to direct the substance 115 along the first direction 110 (e.g. within an angular threshold of the direction of gravitational acceleration), in one embodiment the system 200 is designed to direct the substance 215 along a second direction 210 that is oriented in an opposite direction from the first direction 110. In one example embodiment, the second direction 210 is oriented in an opposite direction (or within the angular threshold of the opposite direction) from the direction of gravitational acceleration. Accordingly, in one example embodiment, the surface 220 is positioned above the housing 216 (e.g. within a threshold distance of the housing 216) so that the pumped substance 215 through the openings 219 in the second direction 210 forms the pattern 225 on the surface 220. In one example embodiment, where the second direction 210 is oriented opposite from the direction of gravitational acceleration, the substance 215 and/or the surface 220 is selected such that the formed pattern 225 of the substance 215 adheres to the surface 220 and thus does not fall from the surface 220 due to gravitational acceleration.

A method for using one or both of the systems 100, 200 of FIGS. 1, 2 will now be discussed. FIG. 5 is a flow chart that illustrates an example of a method 500 for dispensing a substance in one of multiple patterns, according to an embodiment. Although steps are depicted in the flowchart of FIG. 5 as integral steps in a particular order for purposes of illustration, in other embodiments, one or more steps, or portions thereof, are performed in a different order, or overlapping in time, in series or in parallel, or are omitted, or one or more additional steps are added, or the method is changed in some combination of ways.

In an embodiment, in step 501 the removable component 118, 218 is positioned within the housing 116, 216. In this embodiment, the removable component 118, 218 defines one or more first openings 119, 219 arranged in a first pattern.

In an embodiment, in step 502 the pump 114, 214 directs substance 115, 215 from the container 112, 212 through the one or more first openings 119, 219 of the first removable component 118, 218 within the housing 116, 216.

In an embodiment, in steps 504 and 506 a first pattern 125, 225 of the substance 115, 215 is formed on the surface 120, 220. In one embodiment, step 504 is performed based on step 502 that directs the substance 115, 215 through the one or more first openings 119, 219 of the first removable component 118, 218 that is within the housing 116, 216.

In some embodiments, after step 506 where the first pattern 125, 225 of the substance 115, 215 is formed on the surface 120, 220 the user decides at block 507 whether to form the same first pattern 125, 225 with the substance 115, 215 on another surface 120, 220. If the answer to this determination in block 507 is yes, the method 500 proceeds back to repeat steps 502 through 506 so that the same pattern 125, 225 is formed on another surface 120, 220. If the answer to this determination in block 507 is no, then the method 500 proceeds to block 508 where a determination is made whether to form a different pattern with the substance 115, 215 on the surface 120, 220 than the first pattern 125, 225 of the substance 115, 215. In one embodiment, where the user decides at block 508 to form the different pattern with the substance 115, 215 on the surface 120, 220 the method 500 proceeds to block 510. In another embodiment, where the user decides at block 508 not to form a different pattern with the substance 115, 215 on the surface 120, 220 the method 500 proceeds to block 512 and the method 500 ends.

In an embodiment, in step 510 after the user decided at block 508 to form a different pattern with the substance 115, 215 on the surface 120, 220 a second removable component 117 is selected by the user which is different from the first removable component 118. In one embodiment, the second removable component 117 has one or more second openings 113 that are arranged in a different second pattern than the one or more first openings 119 of the first removable component 118 that are arranged in a first pattern.

In an embodiment, in step 510 after the user selects the second removable component 117, the first removable component 118 is removed from within the housing 116, 216. In an example embodiment, the housing 116, 216 includes one or more components that define an interior of the housing 116, 216 where the first removable component 118 is positioned and one or more of these components are moved to access the interior of the housing 116, 216 to remove the first removable component 118.

In an embodiment, in step 510 after the first removable component 118 is removed from the housing 116, 216, the second removable component 117 is positioned within the housing 116, 216 (e.g. within the interior of the housing 116, 216 where the first removable component 118 was previously positioned).

In an embodiment, after the first removable component 118 is replaced with the second removable component 117, steps 502 through 508 are repeated with the second removable component 117 positioned within the housing 116, 216. In an embodiment, in step 507 the user decides whether to form the substance in the same pattern with the second removable component 117. If the determination in step 507 is yes, the method 500 proceeds back to repeat steps 502 through 506 to form the substance in the same pattern with the second removable component 117. If the determination in step 507 is no, then the method 500 moves to step 508 where the user decides whether to form the substance in a different pattern than with the second removable component 117. If this decision is in the affirmative, the method proceeds to block 510 and a third removable component having a different pattern of openings than the second removable component 117 is used to replace the second removable component 117. The method then proceeds back to steps 502 through 508 with the third removable component and this process repeats until the decision at block 508 is in the negative.

3. Example Embodiments

Some example embodiments of the system 100, 200 of FIGS. 1 and 2 and the method 500 of FIG. 5 will now be discussed herein. FIGS. 3A through 3H disclose example embodiments of the system 100 of FIG. 1 that direct the substance in the first direction 110. FIGS. 4A through 4D disclose example embodiments of the system 200 of FIG. 2 that direct the substance in the second direction 210.

Figure 3B:
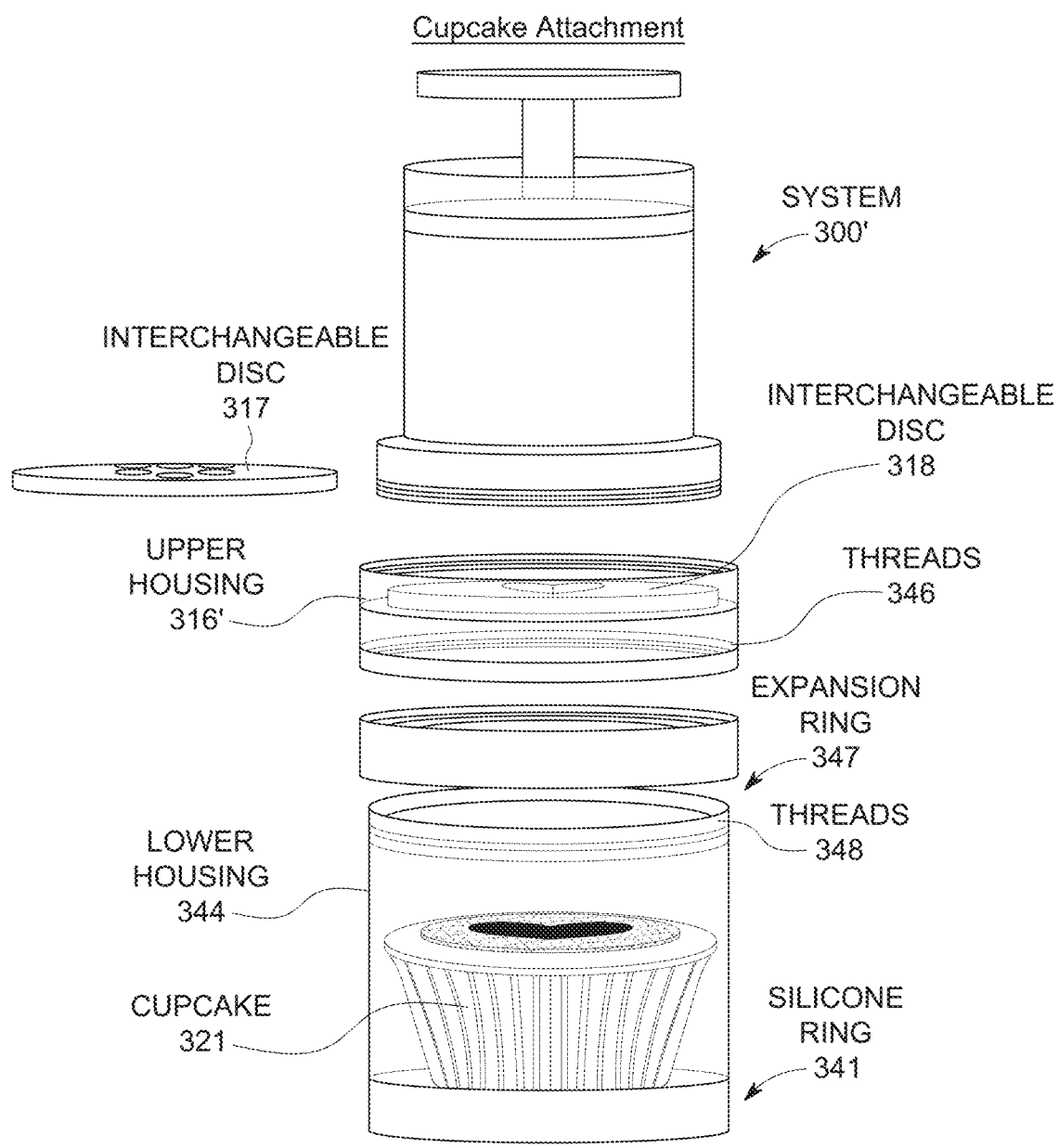
FIG. 3B is an image that illustrates an example of an exploded view of the system of FIG. 3A to dispense the substance in one of multiple patterns on a surface of a different food item, according to an embodiment.

FIGS. 3A and 3B are images that illustrate an example of an exploded view of a system 300, 300' for dispensing a substance in one of multiple patterns on a surface of a food item, according to an embodiment. In one embodiment, the substance is icing (e.g. with a viscosity value in a range from about 100 cps to about 10,000 cps) and the food item is a dessert item on which icing is routinely placed (e.g. cookie, cupcake, etc.).

In an embodiment, the system 300 of FIG. 3A shows the container 312. In an embodiment, the pump 114 is a manual pump and includes a pump head 314 and a piston 311 which is movable within a container 312 based on movement of the pump head 314. In an example embodiment, the pump head 314 and piston 311 form a syringe-type of pump that presses substance (e.g. icing) out of the container 312 based on the pump head 314 being manually moved by a user which then causes the piston 311 to push the substance out of an outlet of the pump. In an example embodiment, the pump includes threads 334 that are used to engage threads 336 of a housing 316 to secure the pump to the housing 316. The pump head 314 is movable relative to the container 312. In an embodiment, the manual pump directs substance (e.g. icing) out of the container 312 when the pump head 314 is moved by the user, such that the piston 311 moves within the container 312 and presses substance (e.g. icing) out of the container 312, through an outlet of the pump. As with the system 100, the pump of the system 300 directs the substance in the first direction 110 (e.g. within an angular threshold of the direction of gravitational acceleration).

In an embodiment, the first removable component 118 of the system 300 is a first interchangeable disc 318 with one or more first openings 319 that define a first pattern. In this embodiment, the housing 116 of the system 300 is a housing 316 with an interior that is configured to hold the first interchangeable disc 318. In an example embodiment, as shown in FIG. 3A, the housing 316 includes a ledge 338 positioned within an interior of the housing 316. The ledge 338 is configured to removably hold the first interchangeable disc 318 within the interior of the housing 316 and to prevent the first interchangeable disc 318 from moving in the first direction 110 beyond the ledge 338 as the substance 115 is directed through the one or more first openings 319 in the first direction 110.

In an embodiment, the housing 316 includes a top defining a first opening and a first set of threads 336. The housing 316 also includes a bottom defining a second opening. In an example embodiment, a silicone ring 340 is secured around a perimeter of the second opening (e.g. to prevent the housing 316 from otherwise sliding around on a surface). In this embodiment, the ledge 338 is positioned within the interior of the housing 316 between the first opening and the second opening. Upon positioning the first interchangeable disc 318 on the ledge 338 within the housing 316, the first set of threads 336 at the top of the housing 316 are configured to engage a second set of threads 334 at the outlet of the pump head 314. This threaded connection secures the housing 316 to the pump outlet of the pump head 314.

In one embodiment, to position the first interchangeable disc 318 in the interior of the housing 316, the housing 316 is first separated from the pump head 314 by disengaging the threads 334 of the pump head 314 from the threads 336 on the top of the housing 316. The first interchangeable disc 318 is then inserted through the opening in the top of the housing 316 and positioned on the ledge 338. In an example embodiment, the outer diameter of the first interchangeable disc 318 is greater than the inner diameter of the ledge 338. The housing 316 is then secured back to the pump head 314 by engaging the threads 334, 336.

In this embodiment, the pump of the system 300 is then activated (e.g. by manual means) by the user moving the pump head 314 towards the container 312. In this embodiment, the piston 311 of the pump then directs the substance (e.g. icing) from the container 312 through the one or more first openings 319 of the first interchangeable disc 318 in the first direction 110. As a result of the substance being moved through the one or more first openings 319 in the first interchangeable disc 318, a pattern 325 of the substance (e.g. icing) is then formed on a surface of the food item (e.g. cookie 320). In this example embodiment, the cookie 320 is positioned below the housing 316, since the icing is moved in the first direction 110 (e.g. in the direction of the gravitational force) so that the icing pattern 325 is formed on the cookie 320.

Figure 3C:
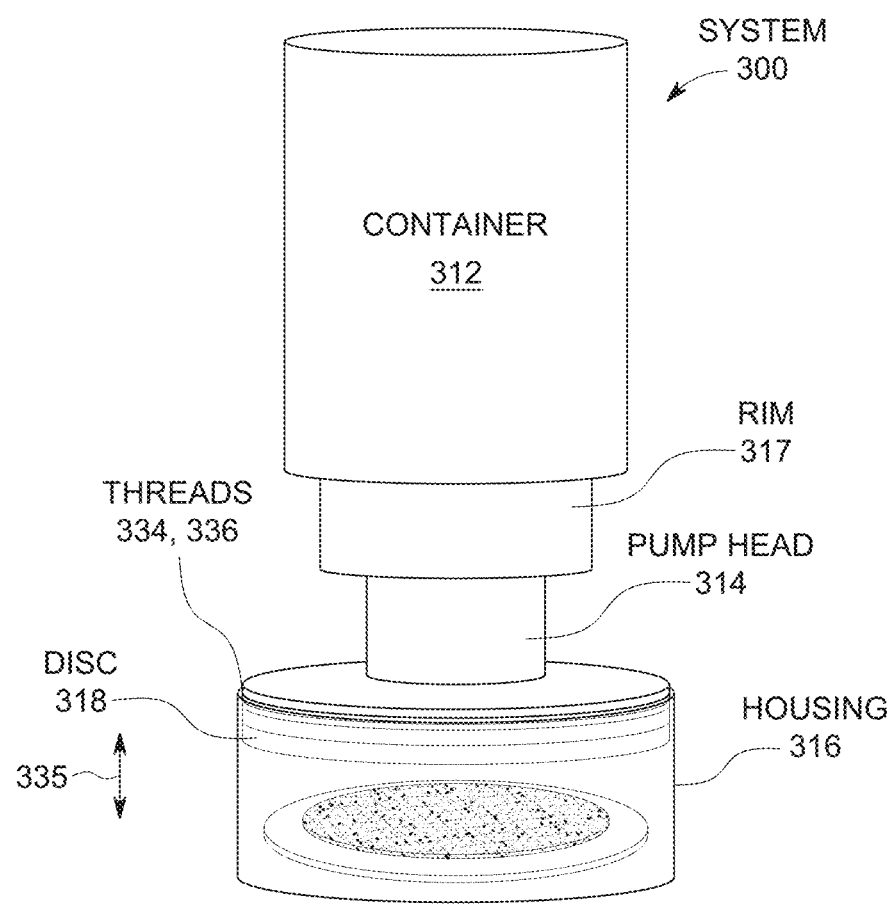
FIG. 3C is an image that illustrates an example of a side view of the system of FIG. 3A with the container holding the substance, according to an embodiment.

FIG. 3C is an image that illustrates an example of a side view of the system 300 of FIG. 3A with the container 312 holding the substance, according to an embodiment. As shown in FIG. 3C, in one embodiment the system 300 is arranged so that the surface of the food item (e.g. cookie 320) on which the pattern 325 of the substance is to be formed is positioned within a threshold separation 335 from the interchangeable disc 318. In an example embodiment, the threshold separation 335 is measured along the first direction 110. In an example embodiment, the inventor recognized that the threshold separation 335 cannot be too large or else the pattern 325 of the substance will not be formed on the surface of the food item, as too much space is provided between the interchangeable disc 318 and the food item and thus forces due to gravity will deform the pattern which is formed on the food item surface. Additionally, the inventors recognized that the threshold separation 335 cannot be too small or else the substance passing through the openings 319 in the first interchangeable disc 318 will likely smudge over the food item surface. Thus, in an example embodiment, the inventor recognized that the threshold separation 335 should be within a range from about 0.5 inches to about 2 inches.

In an embodiment, the system 300 is configured such that the first interchangeable disc 318 with the one or more first openings 319 can be removed from the housing 316 and replaced with the second interchangeable disc 317 having one or more second openings arranged in a different pattern than the one or more first openings 319 in the first interchangeable disc 318. The system 300 is then operated as above, where the pump directs the icing in the first direction 110 through the one or more second openings of the second interchangeable disc 317 and forms a pattern 327 (FIG. 3E) on the cookie 320 that is different from the pattern 325 (FIG. 3A) formed on the cookie 320 by the first interchangeable disc 318. In an example embodiment, the one or more first openings 319 of the first interchangeable disc 318 form a heart shaped pattern which forms the heart shaped pattern 325 of icing on the cookie 320. In another example embodiment, the one or more second openings of the second interchangeable disc 317 form a flower shaped pattern which forms the flower shaped pattern 327 of icing on the cookie 320, as shown in FIG. 3E.

The system 300' of FIG. 3B is similar to the system 300 of FIG. 3A with the exception that the system 300' of FIG. 3B is configured to form the pattern of the substance (e.g. icing pattern) on a larger food item (e.g. cupcake 321) than the system of FIG. 3A (e.g. cookie 320). FIG. 3B is an image that illustrates an example of an exploded view of the system 300 of FIG. 3A to dispense the substance in one of multiple patterns on a surface of a different food item, according to an embodiment.

Figure 3D:
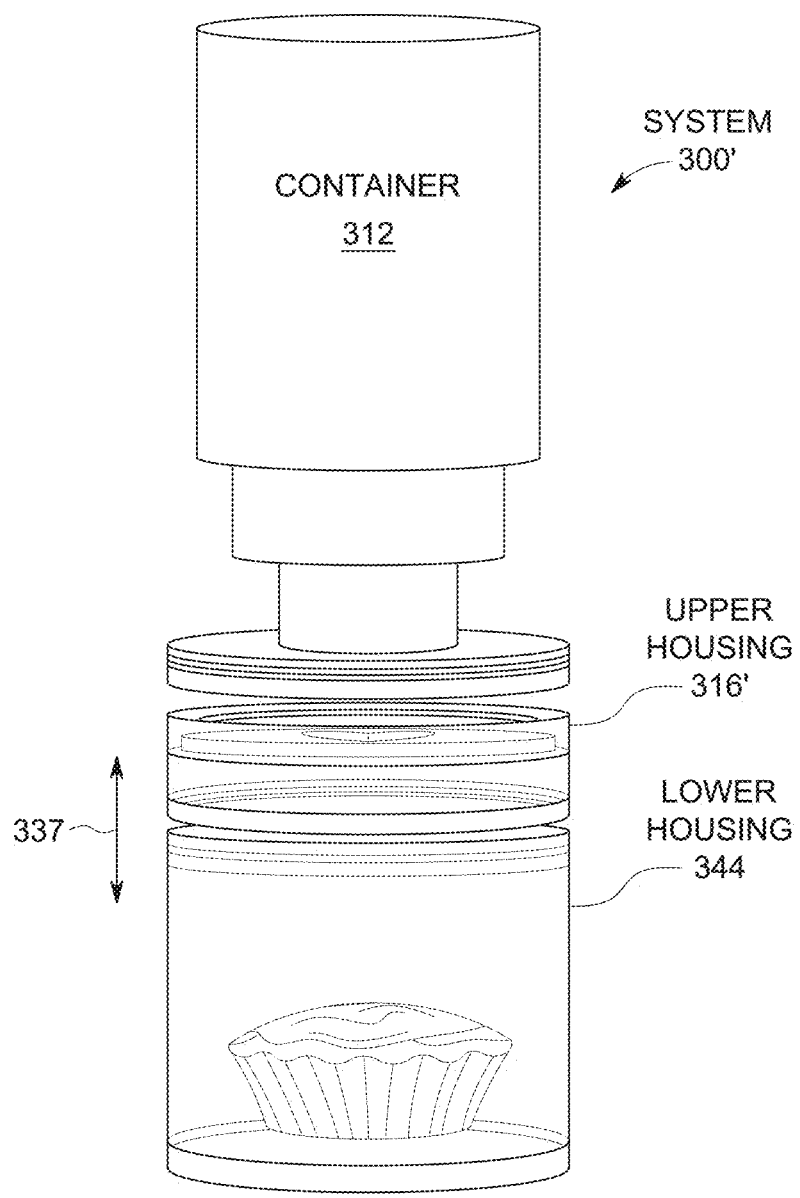
FIG. 3D is an image that illustrates an example of a side view of the system of FIG. 3B with the container holding the substance, according to an embodiment.
Figure 3E:
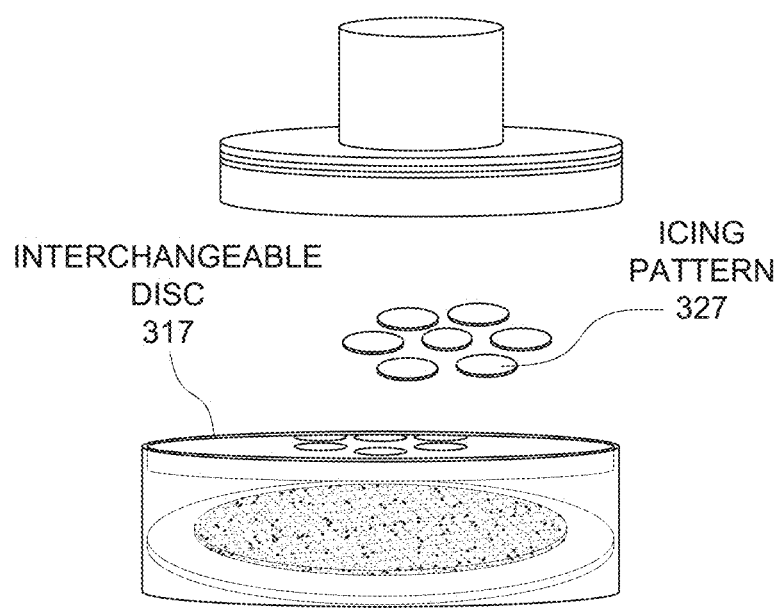
FIG. 3E is an image that illustrates an example of the pattern of the dispensed substance on the food item using the system of FIG. 3A, according to an embodiment.
Figure 3F:
FIGS. 3F through 3H are images that illustrate an example of a side view of the system of FIG. 3B with an adjustable platform to vary a position of the food item, according to an embodiment.
Figure 3G:
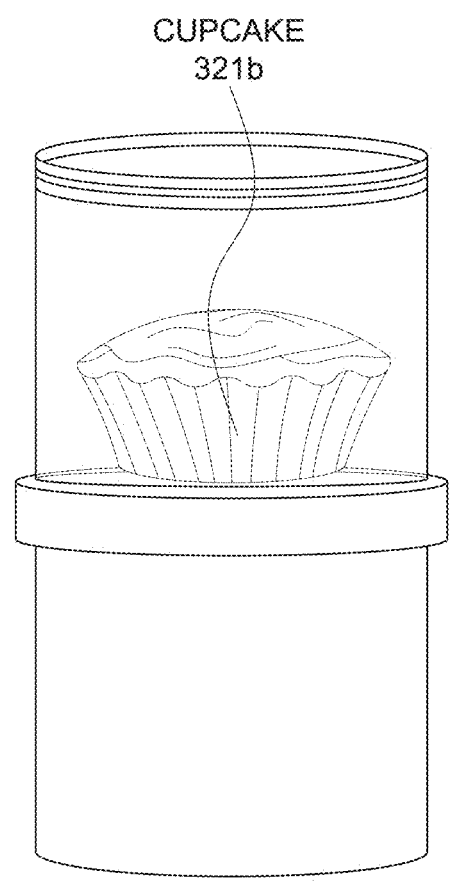
Figure 3H:
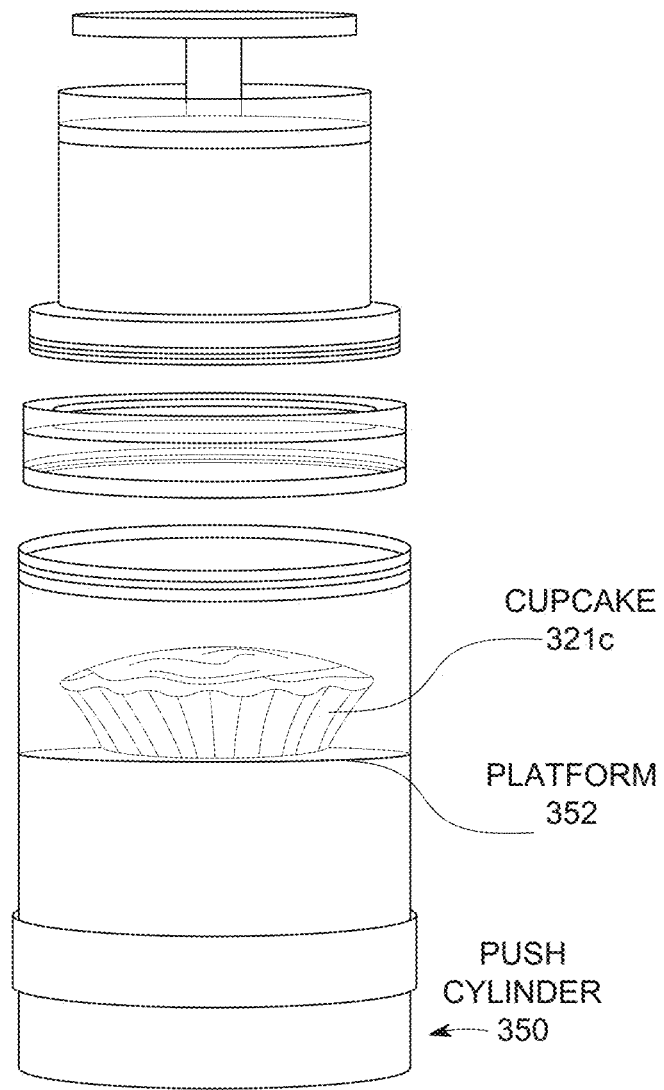

FIG. 3D is an image that illustrates an example of a side view of the system 300' of FIG. 3B with the container 312 holding the substance, according to an embodiment. As shown in FIG. 3D, in one embodiment the housing of the system 300' of FIG. 3B is different from the housing 316 of the system 300 of FIG. 3A. In one embodiment, the housing of the system 300' in FIG. 3B includes an upper housing 316' that is similar to the housing 316 of FIG. 3A and a lower housing 344. In an example embodiment, the upper housing 316' features the ledge 338 to hold the first interchangeable disc 318 and threads 336 along the top of the upper housing 316' to secure the upper housing 316' to the threads 334 of the pump head 314. Additionally, the upper housing 316' includes lower threads 346 that are configured to secure the bottom of the upper housing 316' to one of an expansion ring 347 or lower housing 344. In one example embodiment, the expansion ring 347 is included in the system 300' and is secured between the upper housing 316' and lower housing 344, to provide additional separation between the interchangeable disc 318 and the food item (e.g. cupcake 321) so that the separation is within a threshold separation 337 (FIG. 3D). In an example embodiment, the threshold separation 337 is similar to the threshold separation 335. In this example embodiment, the threshold separation 337 is selected within a range of values that are similar to the threshold separation 335 based on similar criteria as the threshold separation 335. Thus, in one example embodiment, the expansion ring 347 is used to vary the separation between the interchangeable disc 318 and the top surface of the cupcake 321, such that this separation is within the threshold separation 337.

In another example embodiment, the expansion ring 347 is excluded from the system 300' and instead a push cylinder 350 (FIGS. 3F through 3H) is provided that includes a platform 352 on which the food item (e.g., cupcake 321) is positioned can be adjusted in the second direction 210 to vary a separation between the interchangeable disc 318 and the top surface of the food item. Thus, in this example embodiment, the push cylinder 350 is provided to vary this separation to be within the threshold separation 337. In one example embodiment, if the cupcake 321b is relatively tall, then the push cylinder 350 is moved to lower the cupcake 321b within the lower housing 344 such that the separation between the top surface of the cupcake 321b and the interchangeable disc 318 is within the threshold separation 337. In one example embodiment, if the cupcake 321c is relatively short, then the push cylinder 350 is moved to raise the cupcake 321b within the lower housing 344 such that the separation between the top surface of the cupcake 321c and the interchangeable disc 318 is within the threshold separation 337.

In an embodiment, the substance used in the system 300, 300' is icing having a viscosity in range from about 20 cps to about 5000 cps. The first interchangeable disc 318 is configured to form the icing in the first pattern on a surface of a food item (e.g. cookie 320, cupcake 321, etc.) positioned proximately below to the housing 316.

Figure 4A:
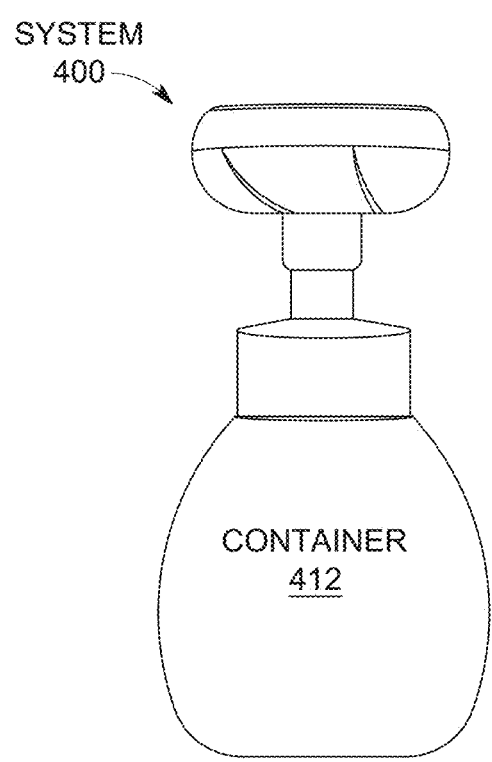
FIG. 4A is an image that illustrates an example of a side view of a system for dispensing a substance in one of multiple patterns on a hand of a user, according to an embodiment.
Figure 4B:
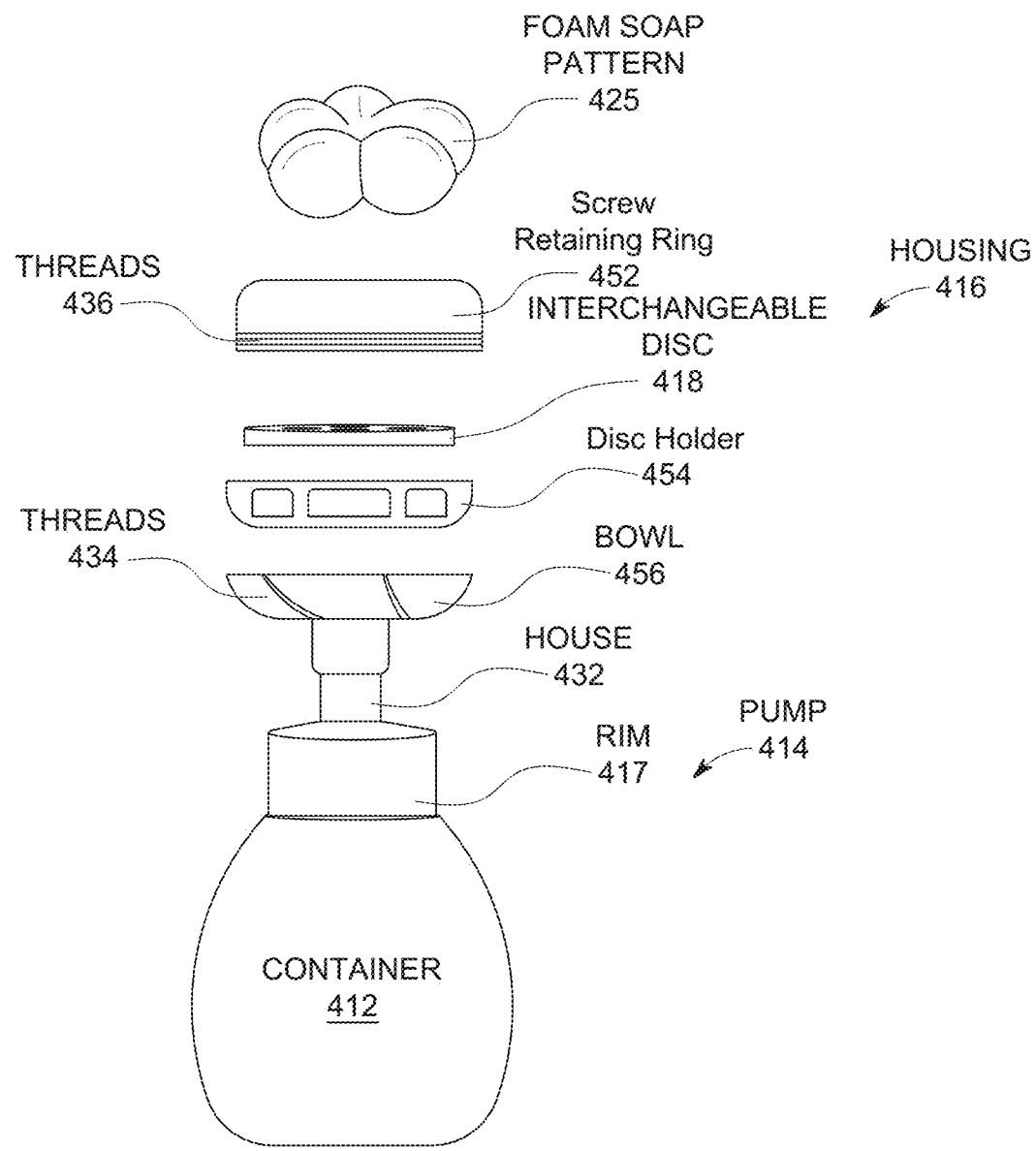
FIG. 4B is an image that illustrates an example of an exploded view of the system of FIG. 4A, according to an embodiment.

A system is now discussed which directs a substance in an opposite direction (e.g. opposite to the direction of gravitational acceleration) than the direction of the system in FIGS. 3A through 3H. In some embodiments, this system is also configured to direct a different substance (e.g. foam soap) than the substance directed by the system of FIGS. 3A through 3H (e.g. icing). FIG. 4A is an image that illustrates an example of a side view of a system 400 for dispensing a substance in one of multiple patterns on a surface, according to an embodiment. FIG. 4B is an image that illustrates an example of an exploded view of the system 400 of FIG. 4A, according to an embodiment. In one embodiment, the surface is a hand of a user but the hand of the user is not part of the system 400. In an embodiment, the system 400 includes a pump that is configured to direct the substance (e.g. foam soap) from the container 412 through the one or more openings of the first interchangeable disc 418 in the second direction 210 (e.g. within the angular threshold of a direction opposite to the direction of gravitational acceleration).

In an embodiment, as shown in FIG. 4B, the housing 416 is secured to the pump 414 such that the first removable component (e.g. first interchangeable disc 418) positioned within an interior of the housing 416 is fixed and prevented from moving in the second direction 210 within the interior of the housing 416 as the substance is directed through the one or more first openings of the first removable component (e.g. first interchangeable disc 418) in the second direction 210.

As shown in FIG. 4B, in one embodiment the housing 416 includes a first set of threads 436 that are configured to engage a second set of threads 434 on the outlet of the pump 414. In this embodiment, the housing 416 is configured to be secured to the outlet of the pump 414 based on the first set of threads 436 of the housing 416 engaging the second set of threads 434 of the pump 414.

In an embodiment, the housing 416 of the system 400 includes an upper housing including a screw retaining ring 452 with the first set of threads 436. The housing 416 also includes a lower housing including a holder 454 that defines an opening 457 (FIG. 4D) sized to receive and hold the first removable component (e.g. first interchangeable disc 418). In another embodiment, the outlet of the pump 414 includes a bowl 456 defining a cavity that is sized to receive the holder 454 and the second set of threads 434 are provided around a perimeter of the cavity. In some embodiments, upon positioning the first interchangeable disc 418 within the holder 454 and upon further positioning the holder 454 within the cavity of the bowl 456, the first set of threads 436 of the upper housing are configured to engage the second set of threads 434 of the outlet of the pump 414 to secure the first interchangeable disc 418 within the interior of the housing 416. The substance is then subsequently directed through the one or more first openings of the first interchangeable disc 418 in the second direction 210. However, in other embodiments, the system 400 is configured such that the pump 414 directs the substance in the first direction 110 into the user's hand (e.g. the system 400 of FIGS. 4A and 4B where the components of the system are inverted) that is positioned below the housing 416).

FIG. 4C is an image that illustrates an example of a top view of a removable component positioned within a holder of the removable component used in the system 400 of FIG. 4A, according to an embodiment. FIG. 4D is an image that illustrates an example of a top view of the removable component and the holder of FIG. 4C, according to an embodiment. In one embodiment, the first removable component is the first interchangeable disc 418 having a circular or oval shape. In this embodiment, the holder 454 is a disc holder and the opening 457 in the disc holder 454 is a circular or oval shaped opening that is sized to receive and hold the first interchangeable disc 418. Additionally, in this embodiment, the outlet of the pump 414 includes the bowl 456 that defines the cavity that is sized to receive the disc holder 454. Although FIGS. 4C and 4D depict one example of the removable component (e.g. interchangeable disc 418), in other embodiments the removable component (and housing to hold the removable component) can take any form or shape.

In an embodiment, the substance used by the system 400 is foam soap having a viscosity in range from about 20 cps to about 5000 cps. In this embodiment, the first interchangeable disc 418 is configured to form the foam soap in the first pattern on a surface of a hand of a user positioned proximately above the housing 416. In an example embodiment, the screw retaining ring 452 includes an opening such that the directed foam soap through the openings in the first interchangeable disc 418 passes through the opening and adheres to the surface of the hand of the user.

Although FIGS. 3A-3B and FIGS. 4A-4D show some example embodiments of removable components (e.g. interchangeable discs 318, 319, 418), the embodiments of the present invention are not limited to the use of these particular removable components. In an embodiment, the removable components can include one or more openings that form any pattern and the removable components can take any form or shape (e.g. round, square, rectangular, any polygon shape, etc.).

Figure 4E:
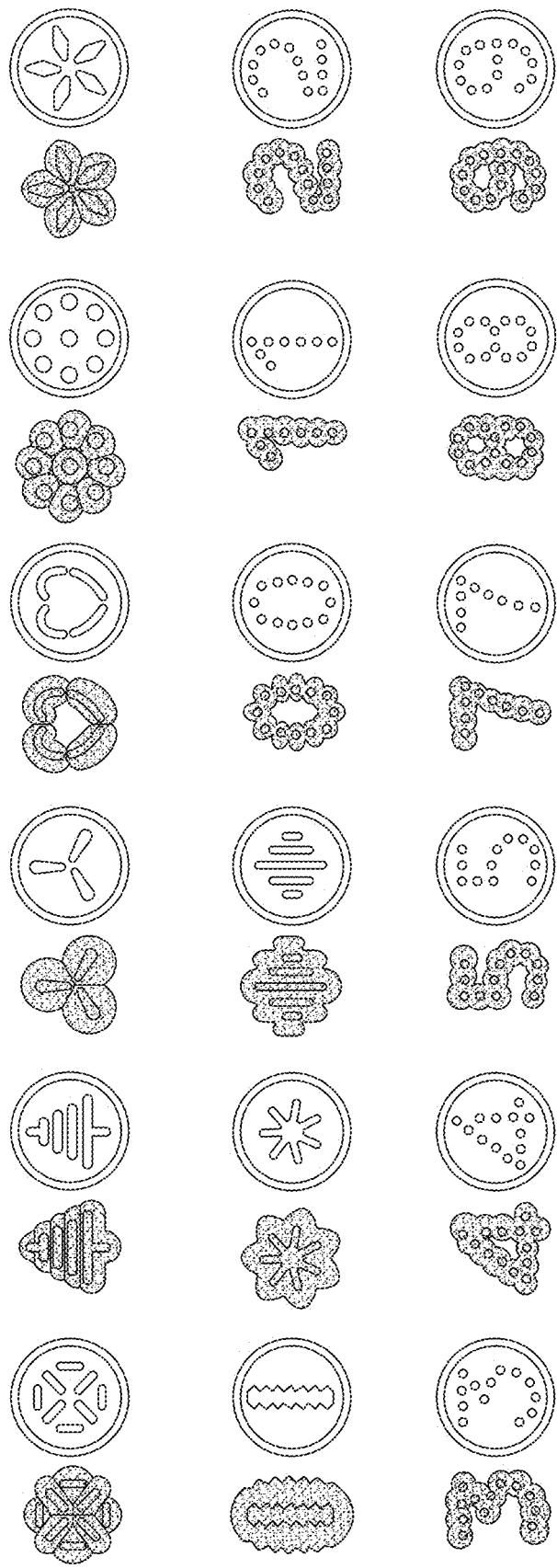
FIG. 4E is an image that illustrates an example of a plurality of removable components that can be used in the system of FIG. 3A or FIG. 4A, according to an embodiment.

FIG. 4E is an image that illustrates an example of a plurality of removable components that can be used in the system of FIG. 3A or FIG. 4A, according to an embodiment. FIG. 4E also depicts resulting substance patterns that are formed with each respective removable component. In an example embodiment, some of the removable components include openings that form a recognizable shape or pattern (e.g. tree, heart, flower, star, etc.) whereas other removable components include opening that form alphanumeric characters (e.g. 1, 2, 3, etc.). The embodiments of the present invention are also not limited to the example removable components depicted in FIG. 4E.

Example embodiments of the method 500 will now be discussed, when practiced using the system 300, 300' of FIG. 3A or 3B.

In step 501, the interchangeable disc 318 is positioned within the housing 316. In one embodiment, the housing 316 is first detached from the pump head 314 by disengaging the threads 334, 336, which reveals an opening in the top of the housing 316. The interchangeable disc 318 is then inserted through the top opening in the housing 316 and mounted on the ledge 338. The housing 316 is then reattached to the pump head 314 by re-engaging the threads 334, 336.

In step 502, the pump of the system 300 is initiated to direct substance (e.g. icing) from the container 312 to the housing 316. In some embodiments, where the pump is a manual pump, the pump head 314 is manually moved by the user towards the container 312, which causes substance to be pumped by the piston 311 in the first direction 110 to the housing 316.

In step 504, as the substance is directed from the pump of the system 300 to the housing 316, the directed substance passes through the one or more openings 319 in the interchangeable disc 318. In one embodiment, this causes the substance to form the pattern 325 (e.g. icing pattern) that is based on the pattern of the one or more openings 319 in the interchangeable disc 318. In an example embodiment, the pattern 325 formed with the substance has a similar shape or form as the pattern formed by the one or more openings 319 but has larger dimensions (e.g. for a heart shaped opening 319 in the interchangeable disc 318, the formed pattern 325 of the substance is a heart shape that is larger than the heart shape opening 319).

In step 506, the substance having passed through the one or more openings 319 in step 504 is directed onto a surface, such as a surface of a food item (e.g. cookie 320). In one embodiment, in step 506 the top surface of the food item is positioned within the threshold separation 335 (FIG. 3C) of the openings 319 such that the pattern 325 of the substance is properly formed on the surface of the food item. In an example embodiment, if the separation between the surface of the food item and the openings 319 is too small, the substance will smudge on the surface of the food item and not properly form the pattern 325, whereas if the separation is too large then the substance will be influenced by the force of gravitational acceleration and also not properly form the pattern 325.

In step 507, the user decides whether they want to form the same substance pattern 325 formed in steps 504 and 506 on another food item surface. If this determination is yes, then the method 500 proceeds back to step 502 through 506 so that the same substance pattern 325 is formed on another food item surface. If this determination is no, then the method 500 proceeds to step 508.

In step 508, the user decides whether they want to form a substance pattern on a food item that is different than the pattern 325 formed in steps 504 and 506. In an example embodiment, in step 508 the user decides if they want to form an icing pattern on another cookie that is different than the formed pattern 325 formed in steps 504, 506. If step 508 is decided in the affirmative, then the method 500 moves to block 510. If step 508 is decided in the negative, the method 500 ends at block 512.

In step 510, the first interchangeable disc 318 is removed from the interior of the housing 316. In an embodiment, in step 510 the housing 316 is detached from the pump head 314 by disengaging the threads 334, 336. This results in access to the housing 316 interior through the opening in the top of the housing 316. In an embodiment, in step 510 the user then removes the first interchangeable disc 318 from the ledge 338 and out through the opening in the top of the housing 316. The user then replaces the first interchangeable disc 318 with a second interchangeable disc 317 having one or more second openings that form a pattern (e.g. flower) that is different than the pattern (e.g. heart) of the one or more openings 319 in the first interchangeable disc 318. In this embodiment, the user positions the second interchangeable disc 317 on the ledge 338 and then reattaches the housing 316 to the pump head 314 by re-engaging the threads 334, 336.

After performing step 510, steps 502 through 506 are repeated for the second interchangeable disc 317 positioned within the housing 316. In this embodiment, steps 502 through 506 are repeated for a new food item (e.g. new cookie 320) placed below the ledge 338. Step 507 is then repeated to determine whether the user wants to form the same substance pattern in the previous iteration of steps 502 through 506 on another food item (e.g., cookie 320). If the determination in step 507 is yes, the method 500 proceeds back to repeat steps 502 through 506. If the determination in step 507 is no, then step 508 is then repeated to determine whether the user wants to form another substance pattern on the food item that is different than the pattern formed in steps 504, 506.

Example embodiments of the method 500 will now be discussed, when practiced using the system 400 of FIGS. 4A and 4B.

In step 501, the interchangeable disc 418 is positioned within the housing 416. In one embodiment, the screw retaining ring 452 is first detached from the bowl 456 by disengaging the threads 434, 436, which reveals the opening 457 in the disc holder 454 (FIG. 4D). The interchangeable disc 418 is then inserted into the opening 457 in the disc holder 454 (FIG. 4C). The disc holder 454 is then positioned within the cavity of the bowl 456. The screw retaining ring 452 is then reattached to the bowl 456 by re-engaging the threads 434, 436.

In step 502, the pump of the system 400 is initiated to direct substance (e.g. foam soap) from the container 412 to the housing 416. In some embodiments, where the pump is a manual pump, the bowl 456 is manually moved by the user towards the rim 417 or container 412, which causes substance to be pumped through the hose 432 in the first direction 210 to the housing 416.

In step 504, as the substance is directed from the pump of the system 400 to the housing 416, the directed substance passes through the one or more openings 419 in the interchangeable disc 418. In one embodiment, this causes the substance to form the pattern 425 (e.g. foam soap pattern) that is based on the pattern of the one or more openings 419 in the interchangeable disc 418. In an example embodiment, the pattern 425 formed with the substance has a similar shape or form as the pattern formed by the one or more opening 419 but has larger dimensions (e.g. for a flower shaped opening 419 in the interchangeable disc 418, the formed pattern 425 of the substance is a flower shape that is larger than the flower shape opening 419).

In step 506, the substance having passed through the one or more openings 419 in step 503 is directed onto a surface, such as a surface of a hand of a user. In one embodiment, in step 505 the surface of the user's hand is positioned within a threshold separation (e.g. about ½ inch) of the opening 419 such that the pattern 425 of the substance is properly formed and adhered on the surface of the user's hand. In an example embodiment, if the separation between the surface of the hand and the opening 419 is too small, the foam soap will smudge on the surface of the hand and not properly form the pattern 425, whereas if the separation is too large then the substance will not even reach and thus not adhere to the hand of the user and instead will be overcome by the force of gravitational acceleration.

In step 507, the user decides whether they want to form another substance pattern on the hand (or another hand) that is the same as the pattern 425 formed in steps 504 and 506. In an example embodiment, in step 507 the user decides if they want to form a foam soap pattern on the hand (or another hand) that is the same as the formed pattern 425 formed in steps 504, 506. If step 507 is decided in the affirmative, then the method 500 moves back to repeat steps 502, 504, 506. If step 507 is decided in the negative, the method 500 proceeds to step 508.

In step 508, the user decides whether they want to form a substance pattern on the hand that is different than the pattern 425 formed in steps 504 and 506. In an example embodiment, in step 508 the user decides if they want to form a foam soap pattern on the hand that is different than the formed pattern 425 formed in steps 504, 506. If step 508 is decided in the affirmative, then the method 500 moves to block 510. If step 508 is decided in the negative, the method 500 ends at block 512.

In step 510, the first interchangeable disc 418 is removed from the interior of the housing 416. In an embodiment, in step 510 the screw retaining ring 452 is detached from the bowl 456 by disengaging the threads 434, 436. This results in access to the housing 416 interior and the interchangeable disc 418 in the disc holder 454. In an embodiment, in step 510 the user then removes the first interchangeable disc 418 from the opening 457 in the disc holder 454. The user then replaces the first interchangeable disc 418 with a second interchangeable disc (not shown) having one or more second holes that form a pattern (e.g. heart) that is different than the pattern (e.g. flower) of the one or more openings 419 in the first interchangeable disc 418. In this embodiment, the user positions the second interchangeable disc in the opening 457 in the disc holder 454 and then positions the disc holder 454 into the bowl. The user then reattaches the screw retaining ring 452 to the bowl 456 by engaging the threads 434, 436.

After performing step 510, steps 502 through 506 are repeated for the second interchangeable disc positioned within the housing 416. In this embodiment, steps 502 through 506 are repeated for a user's hand placed above the housing 416. Step 507 is then repeated to determine whether the user wants to form another pattern with the same pattern as in the previous iteration of steps 502 through 506. If this determination in step 507 is yes, then steps 502 through 506 are repeated. If this determination in step 507 is no, then the method 500 moves to step 508. Step 508 is then repeated to determine whether the user wants to form another foam soap pattern on the user's hand that is different than the pattern formed in steps 504, 506.

Figure 6A:
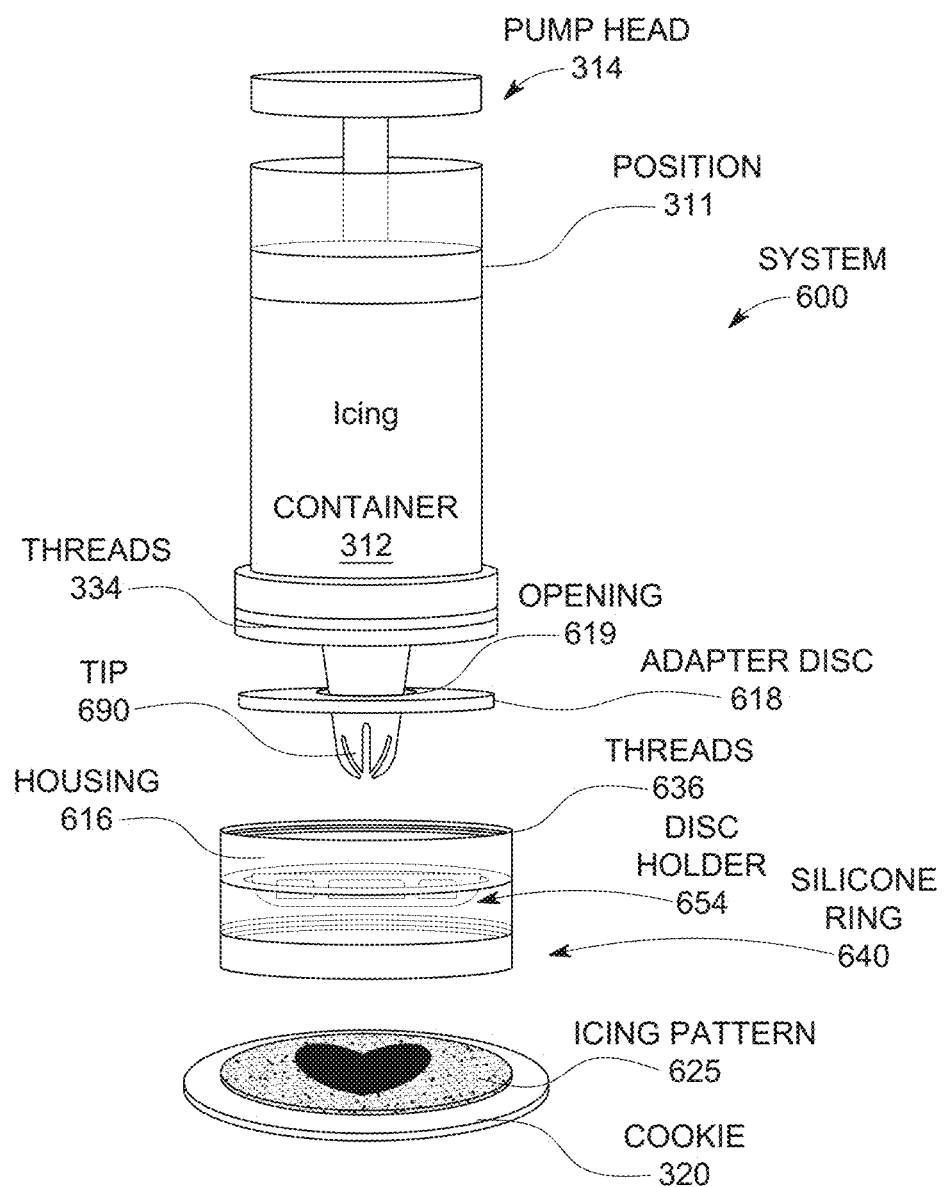
FIG. 6A is an image that illustrates an example of an exploded view of a system for dispensing a substance in one of multiple patterns on a surface of a food item, according to an embodiment.

FIG. 6A is an image that illustrates an example of an exploded view of a system 600 for dispensing a substance in one of multiple patterns on a surface of a food item 320, according to an embodiment. In an embodiment, the system 600 of FIG. 6A is similar to the system 300 of FIG. 3A with the exception of the features discussed herein. In one embodiment, unlike the system 300 of FIG. 3A, the system 600 of FIG. 6A does not feature the interchangeable disc 318 with one or more openings 319 that is used to form the pattern 325 on the food item 320. Instead, the system 600 features a tip 690 attached to a base of the container 312 adjacent an outlet of the pump. The tip 690 is a decorating tip and features an opening that is shaped with a particular pattern in order to form a pattern 625 on the food item 320 that is based on the shape of this opening at the tip 690.

Figure 7:
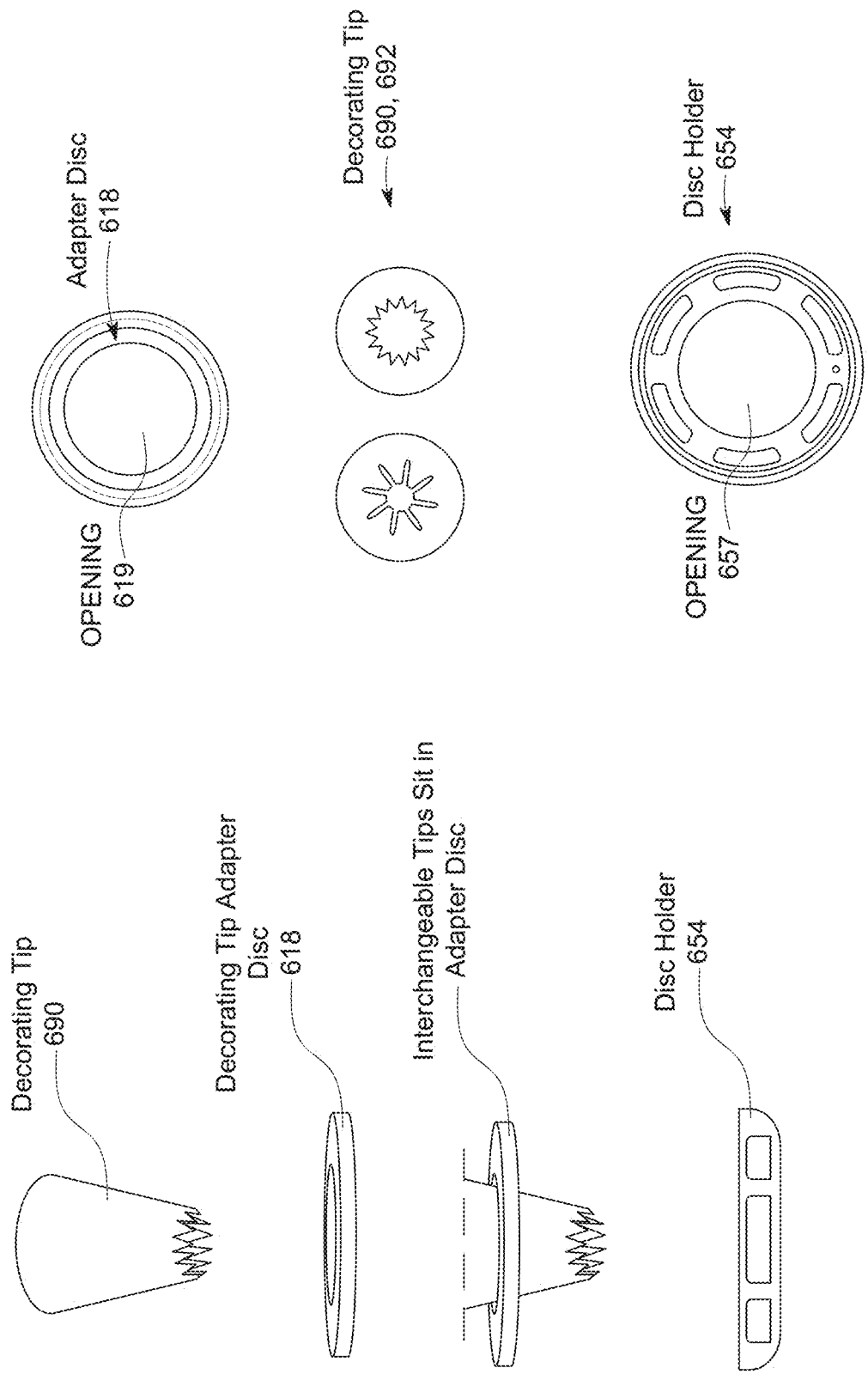
FIG. 7 is an image that illustrates an example of side and top views of various components of the systems in FIGS. 6A and 6B, according to an embodiment.

In an example embodiment, the tip 690 is removable and replaceable with a different tip that has a different shaped opening that can form a pattern on the food item 320 that is different from the pattern 325. FIG. 7 depicts a top view of multiple tips 690, 692 which each define different shaped openings. In an example embodiment, the tip 690 defines an opening that defines a flower shape whereas the tip 692 defines an opening that defines a sun shape. In some embodiments, the system 600 includes multiple tips including less or more than the tips 690, 692 depicted in FIG. 7.

In an embodiment, the housing 616 of the system 600 is different from the housing 316 of the system 300. Unlike the housing 316 of the system 300 which included a ledge 338 to mount the interchangeable disc 318, the housing 616 of the system 600 does not include the ledge but instead includes a disc holder 654 that is similar to the disc holder 454 of FIG. 4B. In this embodiment, the disc holder 654 defines a central opening 657 (FIG. 7) to receive the adapter disc 618 after the tip 690 and adapter disc 618 are inserted through a top opening of the housing 616. The inventor of the present invention recognized that the disc holder 654 advantageously secures the adapter disc 618 so that the tip 690 does not move (e.g. wobble from side to side) as it is used to inject the substance (e.g. icing) from the container 312 and onto the food item 320. As shown in FIG. 7, in one embodiment, the adapter disc 618 has an opening 619 that is sized so to engage the tip 690 between the opening and a top of the tip 690 that is removably attached to the container 312. Thus, the opening 619 cannot be too large or else it will slide up the tip 690 and engage the container 312 and the opening 619 cannot be too small or else it will not permit the opening in the tip 690 to pass through the opening 619.

In an embodiment, although FIG. 6A does not depict a ledge 338 to hold the interchangeable disc 318, in some embodiments the housing 616 (or a second housing) could be provided that also included the ledge 338 to permit the interchangeable disc 317, 318 to be positioned within the housing. In this embodiment, the combination of the shape of the tip 690 opening and the pattern of the one or more openings of the interchangeable disc 317, 318 positioned within the housing would collectively form the pattern on the food item 320 (e.g. cookie).

Figure 6B:
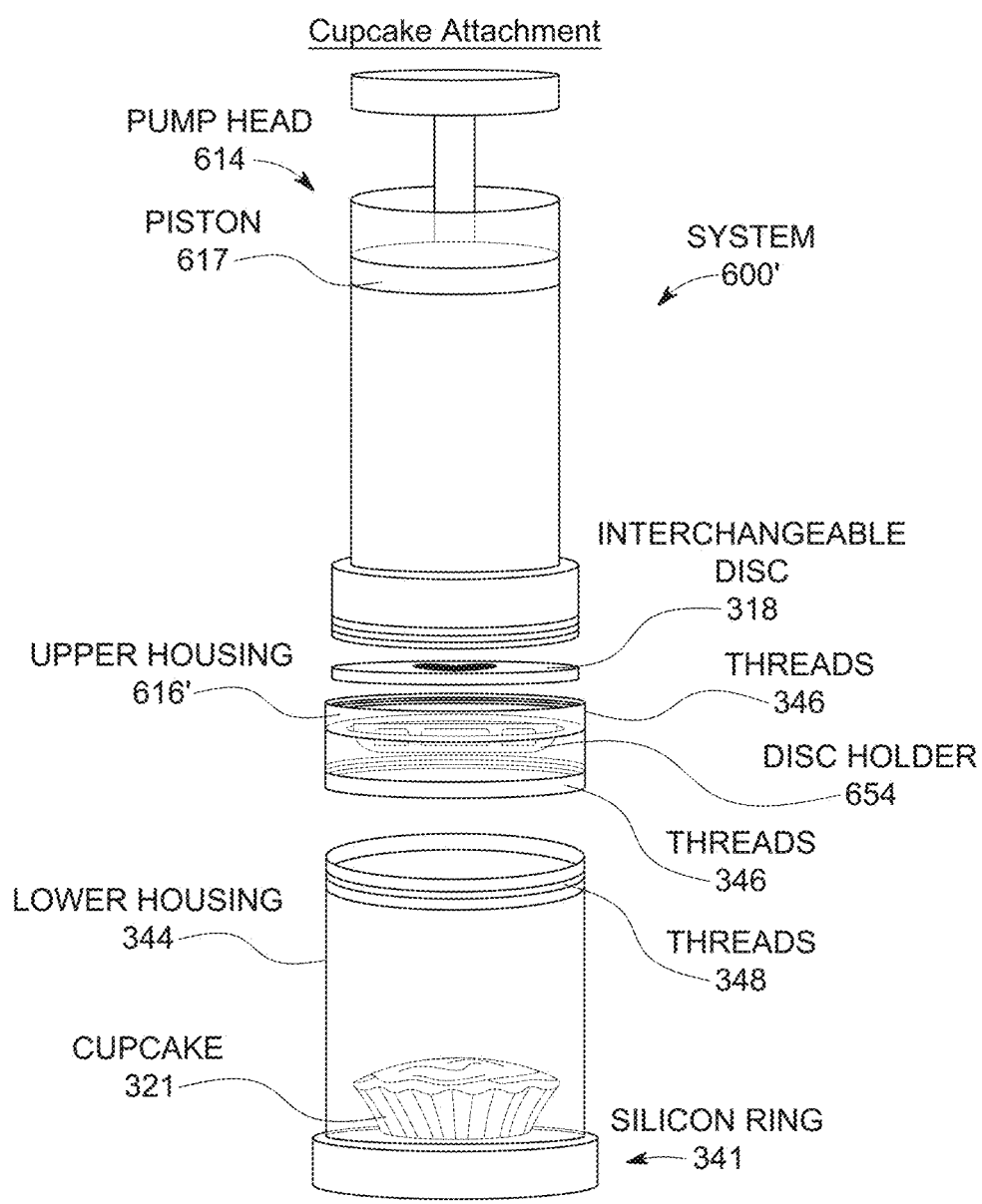
FIG. 6B is an image that illustrates an example of an exploded view of a system for dispensing a substance in one of multiple patterns on a surface of a different food item, according to an embodiment.

FIG. 6B is an image that illustrates an example of an exploded view of a system 600' for dispensing a substance in one of multiple patterns on a surface of a different food item 321, according to an embodiment. In an embodiment, the system 600' of FIG. 6B is similar to the system 300' of FIG. 3B with the exception of the features discussed herein. Unlike the system 300' of FIG. 3B, which positioned the interchangeable disc 318 on the ledge 338 within the upper housing 316', in the system 600' the interchangeable disc 318 is positioned within the disc holder 654 (similar to the disc holder 454 of FIG. 4B) in the upper housing 616'. Thus, in this embodiment, the disc holder 654 holds the interchangeable disc 318 rather than the ledge 338.

Figure 8A:
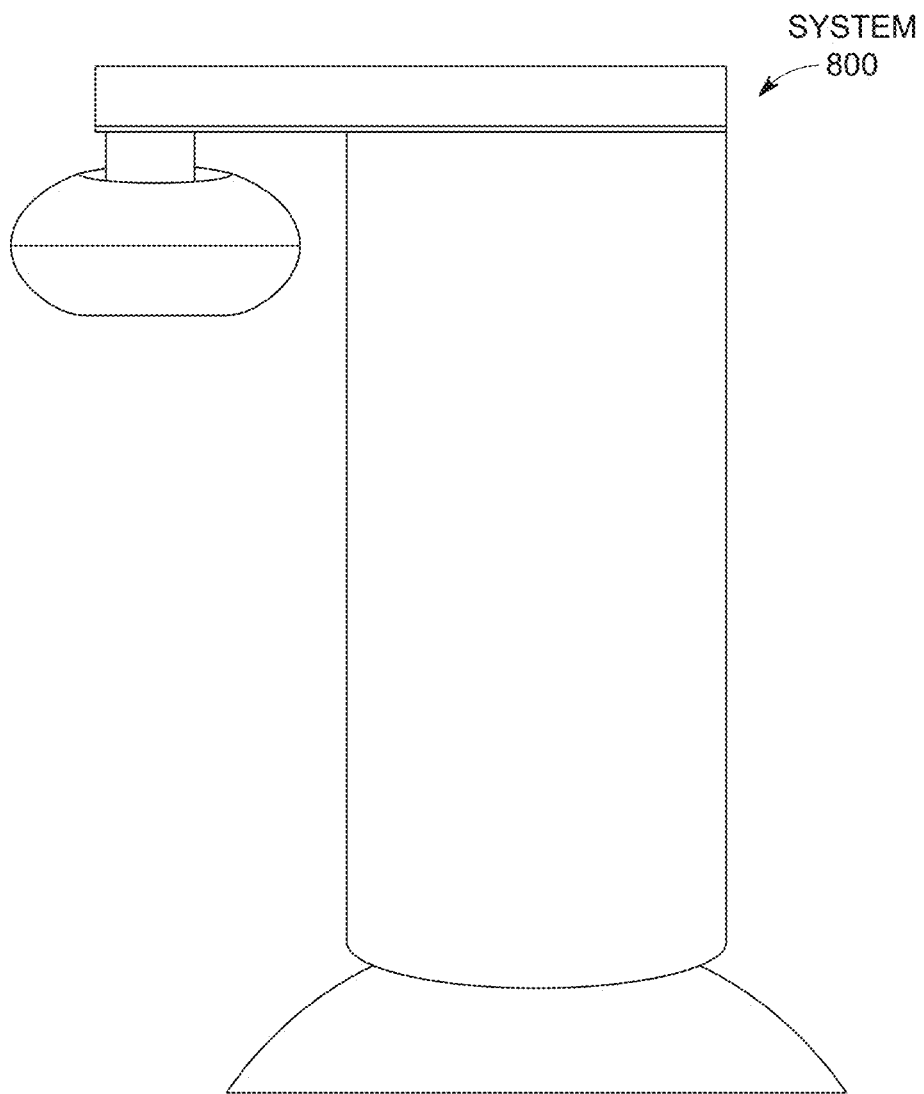
FIG. 8A is an image that illustrates an example of a side view of a system for dispensing a substance in one of multiple patterns on a hand of a user, according to an embodiment.
Figure 8B:
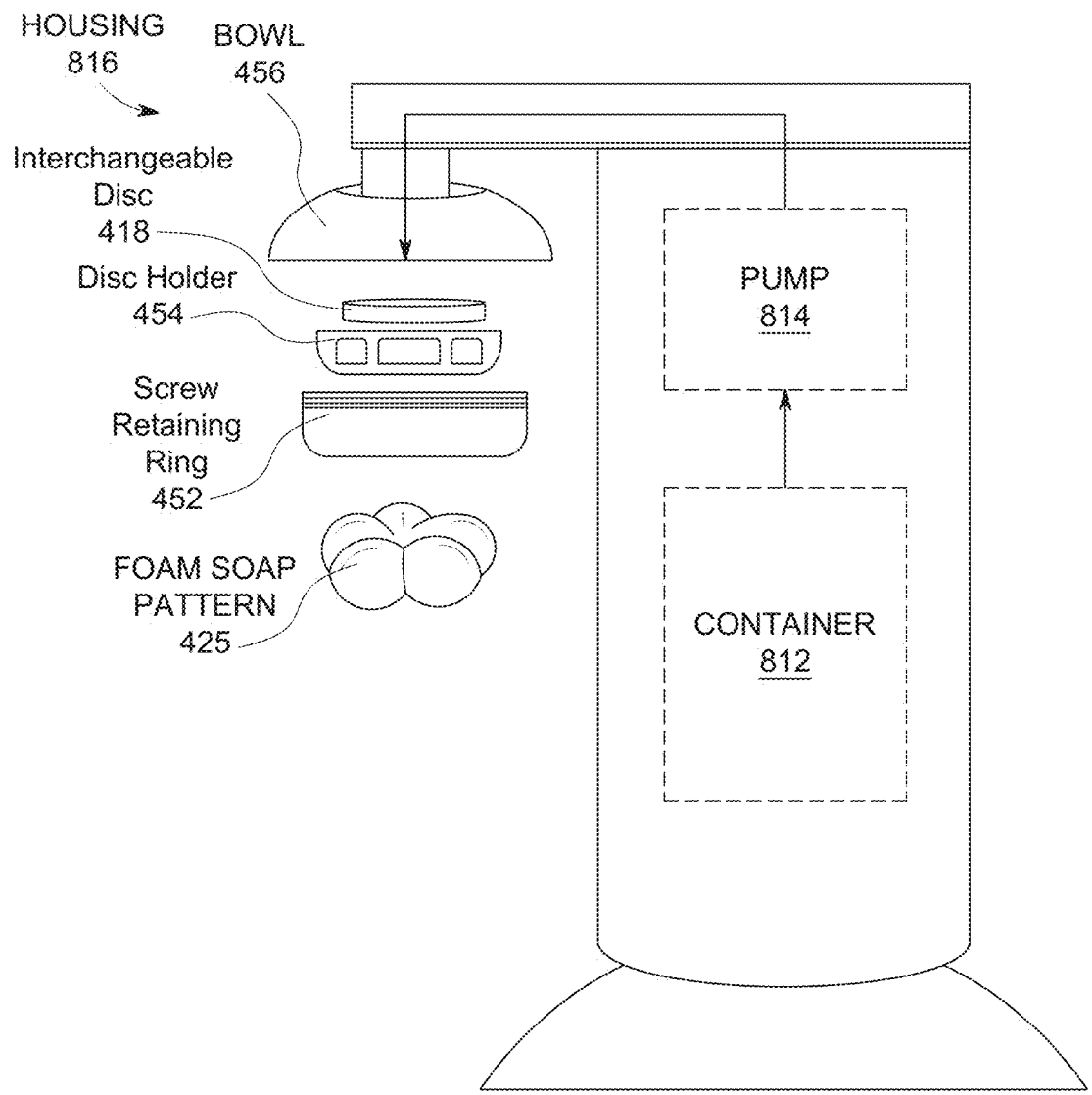
FIG. 8B is an image that illustrates an example of an exploded view of the system of FIG. 8A, according to an embodiment.

FIG. 8A is an image that illustrates an example of a side view of a system 800 for dispensing a substance in one of multiple patterns on a hand of a user, according to an embodiment. FIG. 8B is an image that illustrates an example of an exploded view of the system 800 of FIG. 8A, according to an embodiment. The system 800 is similar to the system 400 previously discussed, with the exception of the features discussed herein. Unlike the system 400 which features a manual pump, the system 800 features an automatic pump. The system 400 featured a manual pump including a hand pump where the user presses down on the housing 416 to move the housing 416 and bowl 456 downward towards the container 412 which is turn caused substance (e.g. foam soap) to be pumped upward through the openings 419 of the interchangeable disc 418. In some embodiments, the system 800 features the controller 101 (FIG. 1) with a sensor 103 (e.g. infrared sensor) that detects user input (e.g. movement of a hand, pressing of a button by the user, etc.). In this embodiment, upon detecting user input the sensor 103 sends a signal the controller 101 which in turn sends a signal to the pump 814 to direct the substance (e.g. foam soap) from the container 812 to the housing 816. Note that in the embodiment of FIGS. 8A and 8B, the pump 814 directs the substance in the second direction 210 (e.g. opposite to the direction of gravitational acceleration) from the container 812 after which the substance is redirected in the first direction 110 through the openings in the interchangeable disc 418 in order to form the pattern 425 on the user's hand (e.g. positioned below the housing 816). However, in other embodiments, the system 800 is configured such that the pump 814 directs the substance in the second direction 210 to the user's hand (e.g. positioned above the housing 816, as in FIG. 4B). In an example embodiment, the container 812 and the pump 814 of the system 800 are similar to the corresponding components in an automatic soap dispenser known to one of ordinary skill in the art, such as automatic soap dispensers manufactured by Secura® (Philippines).

In an embodiment, the components of the system 800 including the bowl 456, the interchangeable disc 418, the disc holder 454 and the screw retaining ring 452 are secured together in a similar manner as described with respect to the system 400, with the exception that the bowl 456 and screw retaining ring 452 are reversed (e.g. in the system 800, the bowl 456 is above the screw retaining 452 whereas in the system 400 the bowl 456 is below the screw retaining ring 452).

Figure 8C:
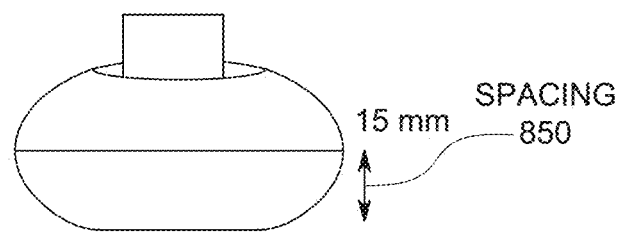
FIGS. 8C and 8D are images that illustrate an example of side and top perspective view of components of the systems in FIGS. 8A and 8B, according to an embodiment.
Figure 8D:
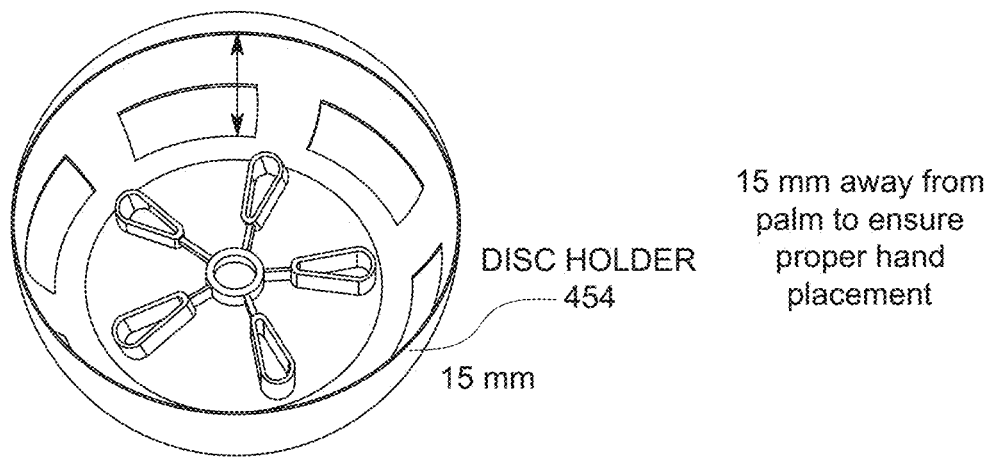

FIGS. 8C and 8D are images that illustrate an example of side and top perspective view of components of the system 800 in FIGS. 8A and 8B, according to an embodiment. In an embodiment, FIG. 8C depicts that the disc holder 454 is configured such that a spacing 850 (e.g. about 15 mm or in a range from about 10 mm to about 20 mm) is arranged between the opening 457 (where the disc 418 is positioned) and a top edge of the disc holder 454. The inventor of the present invention realized that this specific sizing of the spacing 850 ensures that the foam pattern 425 is properly formed in the hand of the user.

Figure 9C:
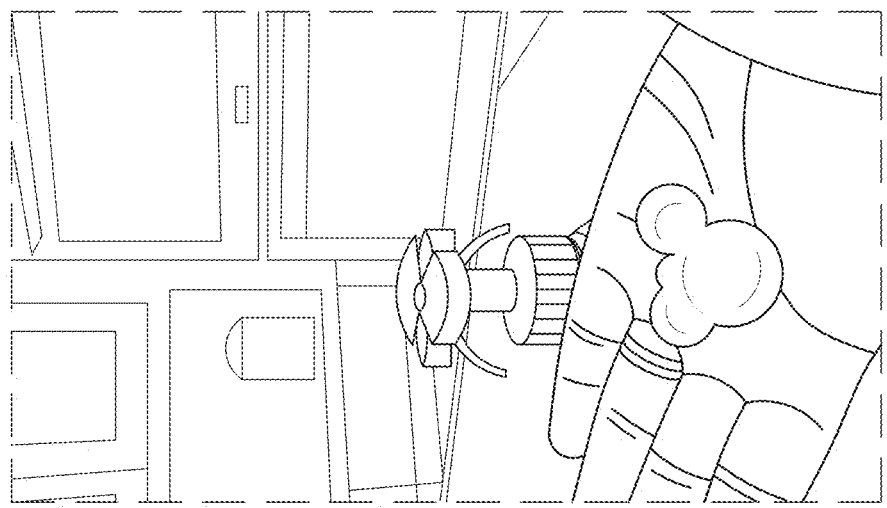
FIGS. 9A through 9C are images that illustrate an example of various stages of using the system in FIGS. 4A and 4B, according to an embodiment.
Figure 9B:
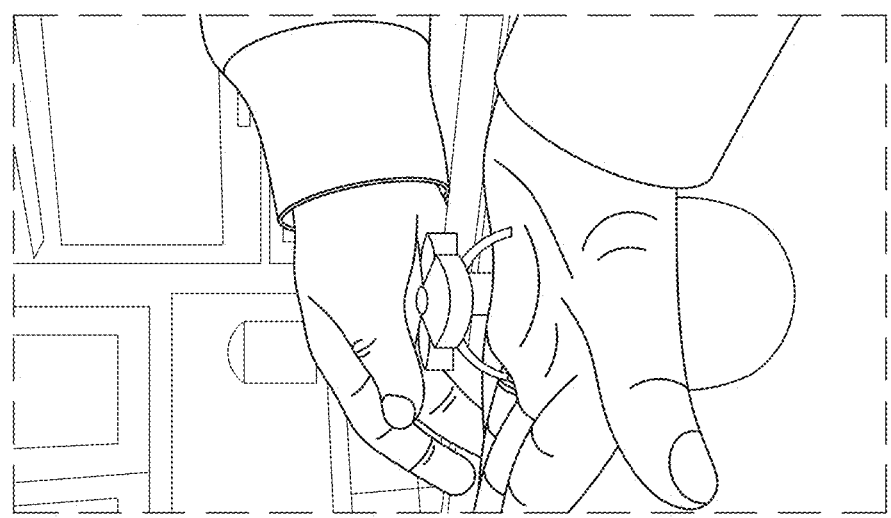
Figure 9A:
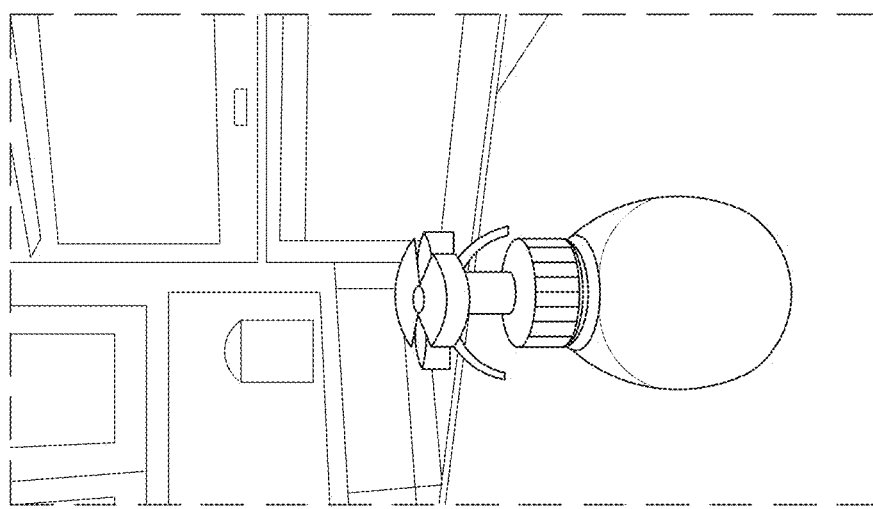
Figure 10:
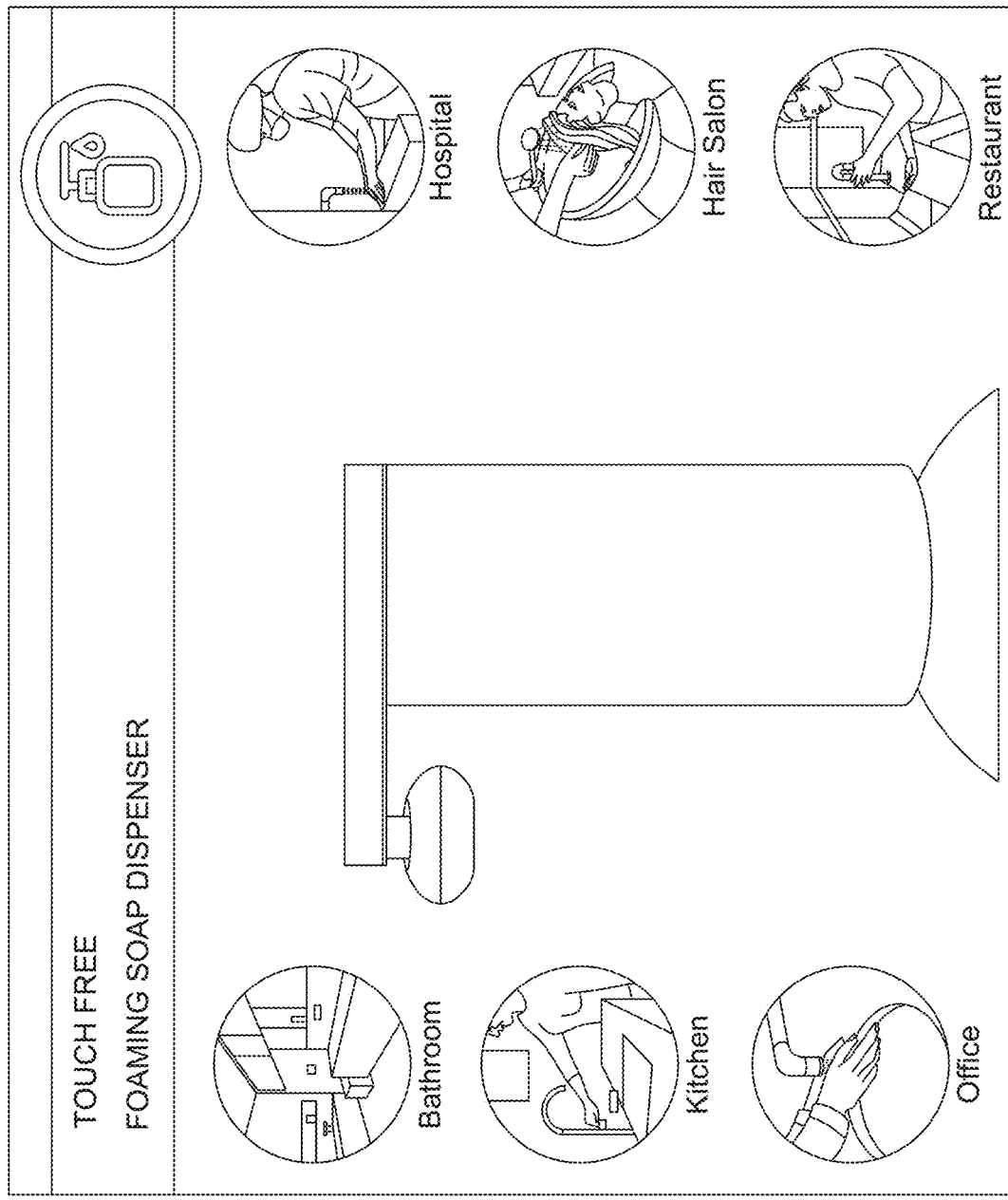
FIG. 10 is an image that illustrates an example of various applications of use of the system of FIGS. 8A and 8B, according to an embodiment.
Figure 11:
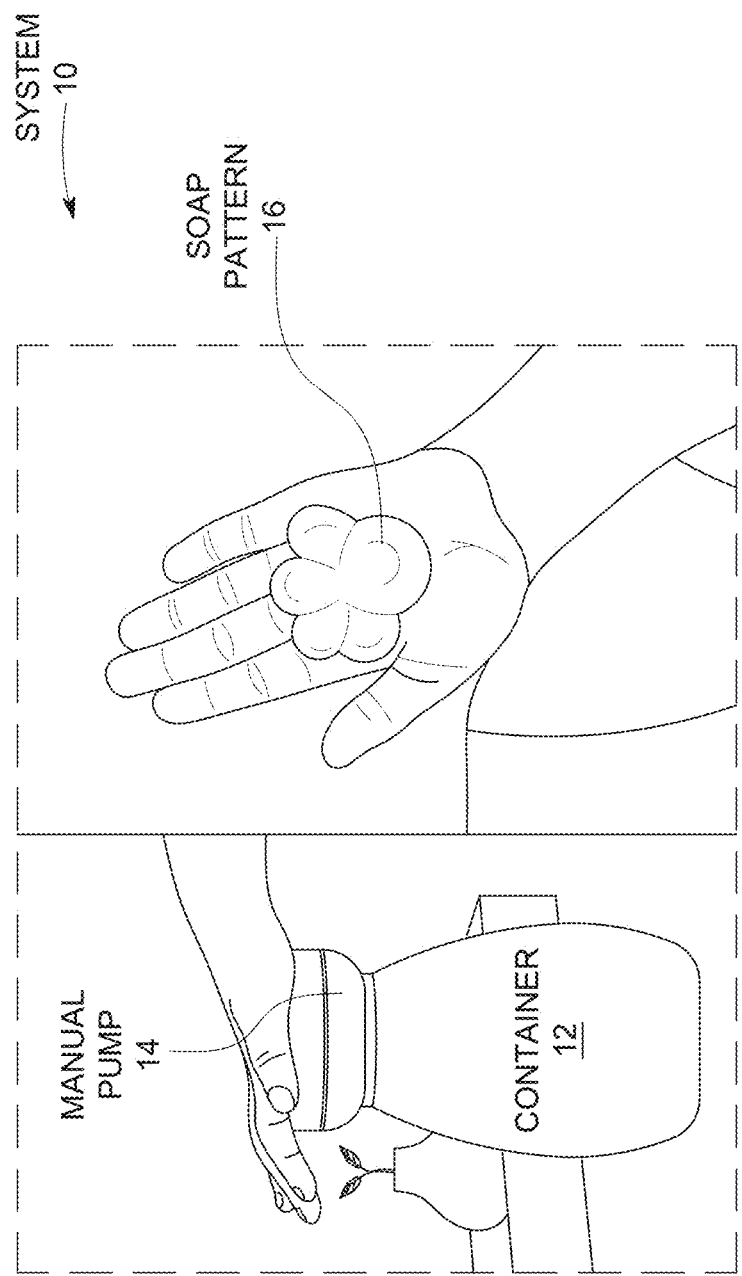
FIG. 11 is an image that illustrates an example of a conventional system for dispensing soap on a hand of a user.
Figure 12:
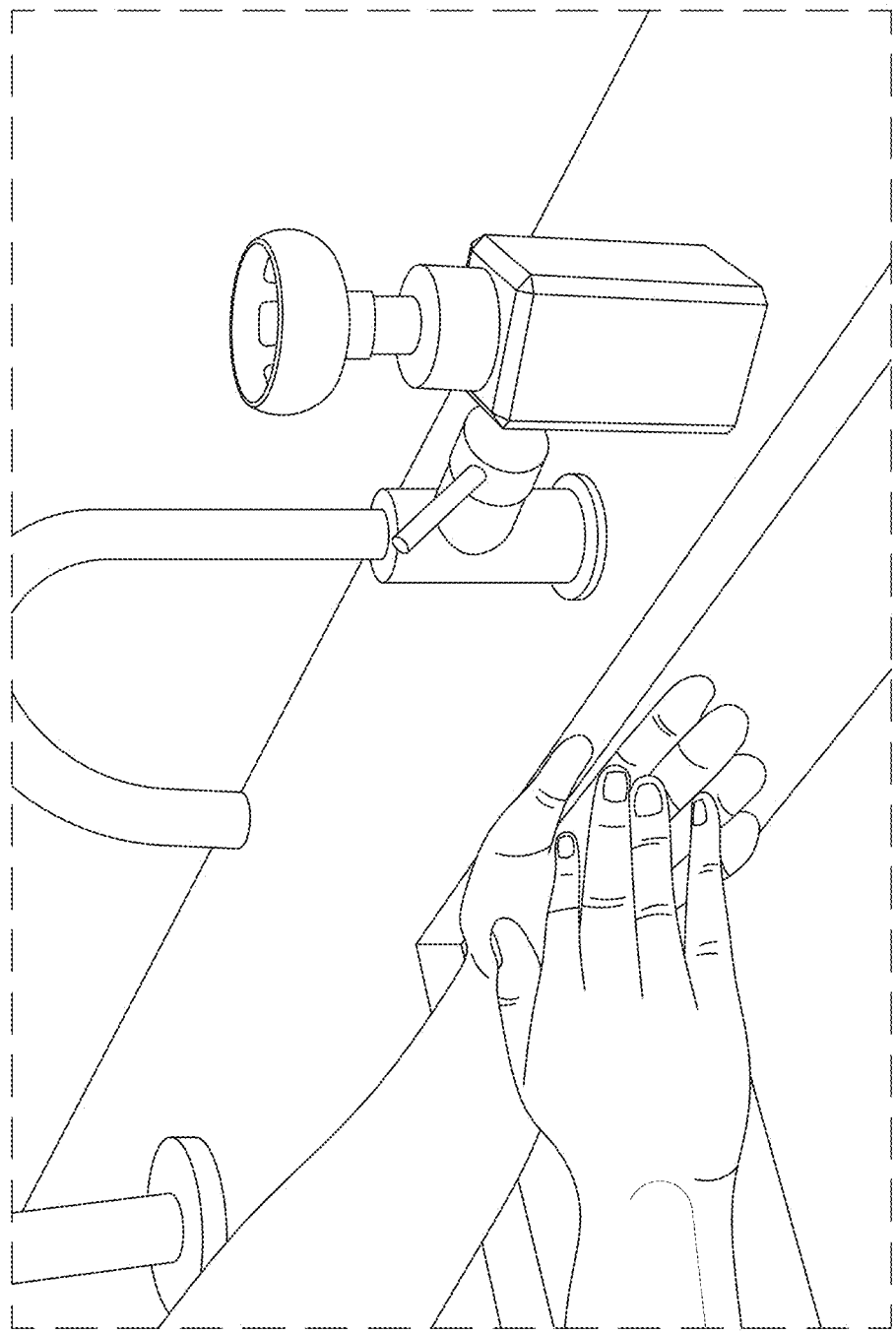
FIG. 12 is an image that illustrates an example of a user washing their hands with the dispensed soap using the conventional system of FIG. 11.

FIGS. 9A through 9C are images that illustrate an example of various stages of using the system 400 in FIGS. 4A and 4B, according to an embodiment. In one embodiment, FIG. 9A shows one example of the system 400 after step 501 is performed (e.g. after the removable disc 418 is positioned within the housing 416). FIG. 9B shows one embodiment where the user is performing step 502 (e.g. where the user presses down on the screw retaining ring 452, thereby moving the bowl 456 towards the container 412 and causing the foam soap to be pumped upwards through the openings 419 in the disc 418). FIG. 9C shows one embodiment after performing steps 504 and 506, namely the foam soap pattern 425 is formed on the hand of the user, having a desirable pattern (e.g. mouse head shape) based on the pattern of the openings 419 in the disc 418. FIG. 10 is an image that illustrates an example of various applications of use of the system 800 of FIGS. 8A and 8B, according to an embodiment.

4. Alternatives, Deviations and Modifications

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense. Throughout this specification and the claims, unless the context requires otherwise, the word "comprise" and its variations, such as "comprises" and "comprising," will be understood to imply the inclusion of a stated item, element or step or group of items, elements or steps but not the exclusion of any other item, element or step or group of items, elements or steps. Furthermore, the indefinite article "a" or "an" is meant to indicate one or more of the item, element or step modified by the article.

Notwithstanding that the numerical ranges and parameters setting forth the broad scope are approximations, the numerical values set forth in specific non-limiting examples are reported as precisely as possible. Any numerical value, however, inherently contains certain errors necessarily resulting from the standard deviation found in their respective testing measurements at the time of this writing. Furthermore, unless otherwise clear from the context, a numerical value presented herein has an implied precision given by the least significant digit. Thus, a value 1.1 implies a value from 1.05 to 1.15. The term "about" is used to indicate a broader range centered on the given value, and unless otherwise clear from the context implies a broader range around the least significant digit, such as "about 1.1" implies a range from 1.0 to 1.2. If the least significant digit is unclear, then the term "about" implies a factor of two, e.g., "about X" implies a value in the range from 0.5× to 2×, for example, about 100 implies a value in a range from 50 to 200. Moreover, all ranges disclosed herein are to be understood to encompass any and all sub-ranges subsumed therein. For example, a range of "less than 10" for a positive only parameter can include any and all sub-ranges between (and including) the minimum value of zero and the maximum value of 10, that is, any and all sub-ranges having a minimum value of equal to or greater than zero and a maximum value of equal to or less than 10, e.g., 1 to 4.

What is claimed is:

1. A system comprising:
    a container configured to hold a substance;
    a pump with an inlet in flow communication with the container and an outlet such that the pump is configured to direct the substance into the inlet and through the outlet; and
    a housing including a first removable component with one or more first openings that define a first arrangement, wherein the first removable component is in flow communication with the pump and the container and wherein the first removable component is replaceable with a second removable component defining one or more second openings that define a second arrangement different from the first arrangement;
    wherein the pump is configured to direct the substance through the outlet and through the one or more first openings in the first removable component such that the substance forms a first pattern on a surface positioned proximate to the housing that is based on the first arrangement of the first removable component;
    wherein the pump is configured to direct the substance through the one or more first openings of the first removable component in a first direction that is about aligned with a direction of gravity;
    and wherein the housing includes a ledge positioned within an interior of the housing, wherein the ledge is configured to removably hold the first removable component within the interior of the housing and to prevent the first removable component from moving in the first direction beyond the ledge as the substance is directed through the one or more first openings of the first removable component in the first direction.

2. The system according to claim 1, further comprising the first removable component and the second removable component.

3. The system according to claim 2, wherein the housing is configured to removably hold the first removable component within the interior of the housing such that the pump is configured to direct the substance through the outlet and through the one or more first openings in the first removable component such that the substance forms the first pattern on the surface that is based on the first arrangement of the one or more first openings.

4. The system according to claim 3, wherein the housing is configured such that the first removable component is removable from the housing and replaceable with the second removable component within the interior of the housing such that the pump is configured to direct the substance through the outlet and through the one or more second openings in the second removable component such that the substance forms a second pattern on the surface that is based on the second arrangement of the one or more second openings.

5. The system according to claim 1, wherein the substance has a minimum viscosity of about 100 centipoise (cps).

6. The system according to claim 5, wherein the substance has a maximum viscosity of about 5000 centipoise (cps).

7. The system according to claim 1, wherein the substance is foam soap having a viscosity in a range from about 20 cps to about 5000 cps, and wherein the first removable component is configured to form the substance in the first pattern on a hand of a user positioned proximate to the housing.

8. The system according to claim 1, wherein the substance is icing having a viscosity in range from about 100 cps to about 5000 cps and wherein the first removable component is configured to form the substance in the first pattern on a surface of a food item positioned proximate to the housing.

9. The system according to claim 1, wherein the housing includes:
    a top defining a first opening and a first set of threads;
    a bottom defining a second opening;
    the ledge positioned within the interior of the housing between the first opening and the second opening;
    wherein upon positioning the first removable component on the ledge within the housing, the first set of threads at the top are configured to engage a second set of threads on the outlet of the pump to secure the top of the housing to the pump outlet.

10. The system according to claim 9, wherein a silicone ring is secured around a perimeter of the second opening such that upon mounting the housing on a surface, the silicone ring is configured to prevent the housing from sliding around on the surface.

11. The system according to claim 9, wherein the substance is icing having a viscosity in range from about 20 cps to about 5000 cps and wherein the first removable component is configured to form the substance in the first pattern on a surface of a food item positioned proximately below to the housing.

12. A system comprising:
    a container configured to hold a substance;
    a pump with an inlet in flow communication with the container and an outlet such that the pump is configured to direct the substance into the inlet and through the outlet; and
    a housing including a first removable component with one or more first openings that define a first arrangement, wherein the first removable component is in flow communication with the pump and the container and wherein the first removable component is replaceable with a second removable component defining one or more second openings that define a second arrangement different from the first arrangement, wherein the one or more first openings and the one or more second openings have a fixed cross sectional area;

wherein the pump is configured to direct the substance through the outlet and through the one or more first openings in the first removable component such that the substance forms a first pattern on a surface positioned proximate to the housing that is based on the first arrangement of the first removable component;

wherein the pump is configured to direct the substance through the one or more first openings of the first removable component in a second direction that is about opposite with a direction of gravity;

and wherein the housing is secured to the pump such that the first removable component positioned within an interior of the housing is fixed and prevented from moving in the second direction within the interior of the housing as the substance is directed through the one or more first openings of the first removable component in the second direction.

13. The system according to claim 12, wherein the housing includes a first set of threads that are configured to engage a second set of threads on the outlet of the pump and wherein the housing is configured to be secured to the outlet of the pump based on the first set of threads of the housing engaging the second set of threads.

14. The system according to claim 13, wherein the housing includes:
an upper housing including a screw retaining ring with the first set of threads;
a lower housing including a holder that defines an opening sized to receive and hold the first removable component;
wherein the outlet of the pump defines a cavity that is sized to receive the holder and wherein the second set of threads are provided around a perimeter of the cavity;
wherein upon positioning the first removable component within the holder and upon positioning the holder within the cavity, the first set of threads of the upper housing are configured to engage the second set of threads of the outlet of the pump to secure the first removable component within the interior of the housing as the substance is directed through the one or more first openings of the first removable component in the second direction.

15. The system according to claim 14, wherein the first removable component is a first interchangeable disc having a circular shape, wherein the holder is a disc holder and the opening in the disc holder is a circular opening that is sized to receive and hold the first interchangeable disc and wherein the outlet of the pump includes a bowl that defines the cavity that is sized to receive the disc holder.

16. The system according to claim 15, wherein the substance is foam soap having a viscosity in range from about 20 cps to about 5000 cps and wherein the first removable component is configured to form the substance in the first pattern on a surface of a hand of a user positioned proximately above the housing.

17. The system according to claim 1, wherein the pump is a manual pump including a pump head and a hose with a distal end positioned within the substance in the container and wherein the manual pump is configured to direct the substance through the outlet and the one or more first openings in the first removable component based on relative movement between the pump head and the container from a first separation to a second separation that is less than the first separation.

18. The system according to claim 1, further comprising:
a sensor configured to detect a manual input of a user; and
a controller is signal communication with the sensor and the pump, wherein the controller is configured to transmit a signal to the pump to automatically initiate the pump to direct the substance through the one or more first openings of the first removable component based on data received from the sensor.

19. A method comprising:
positioning a first removable component within a housing, where the first removable component defines one or more first openings arranged in a first arrangement;
directing, with a pump, substance from a container in a first direction that is about aligned with a direction of gravity through the one or more first openings of the first removable component within the housing;
forming a first pattern with the substance based on the directing the substance through the one or more first openings of the first removable component within the housing;
removing the first removable component from within the housing;
replacing the removed first removable component with a second removable component within the housing that defines one or more second openings arranged in a second arrangement that is different from the first arrangement;
directing, with the pump, substance from the container in the first direction through the one or more second openings of the second removable component within the housing; and
forming a second pattern with the substance based on the directing the substance through the one or more second openings of the second removable component.

* * * * *